(12) United States Patent
Ellis et al.

(10) Patent No.: US 8,973,056 B2
(45) Date of Patent: Mar. 3, 2015

(54) INTERACTIVE PROGRAM GUIDE SYSTEM PROVIDING AN APPLICATION PROGRAM INTERFACE FOR NON-PROGRAM GUIDE APPLICATIONS

(75) Inventors: Michael D. Ellis, Boulder, CO (US); William L. Thomas, Bixby, OK (US); Edward B. Knudson, Littleton, CO (US); Joel G. Hassell, Arvada, CO (US); Kevin B. Easterbrook, Monument, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 10/925,892

(22) Filed: Aug. 23, 2004

(65) Prior Publication Data
US 2005/0283800 A1    Dec. 22, 2005

Related U.S. Application Data

(63) Continuation of application No. 09/346,134, filed on Jul. 16, 1999, now abandoned.

(60) Provisional application No. 60/093,865, filed on Jul. 23, 1998.

(51) Int. Cl.
*H04N 5/445*      (2011.01)
*H04N 21/443*     (2011.01)
(Continued)

(52) U.S. Cl.
CPC ....... *H04N 5/44543* (2013.01); *H04N 21/4431* (2013.01); *H04N 21/4622* (2013.01);
(Continued)

(58) Field of Classification Search
USPC ........ 719/328, 329; 725/39–61; 715/700, 719
See application file for complete search history.

(56) References Cited

U.S. PATENT DOCUMENTS 3,440,427 A    4/1969   Kammer
3,492,577 A    1/1970   Reiter et al.
(Continued)

FOREIGN PATENT DOCUMENTS

CA            2223057        12/1996
CA            2232003         4/1997
(Continued)

OTHER PUBLICATIONS

Leftwich, Jim and Steve Schein. Appendix B: Starsight Interactive Television Guide, Phase III. Palo Alto: Apr. 11, 1997.*
(Continued)

*Primary Examiner* — Farzana Hossain
(74) *Attorney, Agent, or Firm* — Ropes & Gray LLP

(57) ABSTRACT

A system is provided in which an interactive television program guide application and non-program-guide applications are at least partially implemented on user television equipment. A program guide program application interface is provided that is used to maintain a consistent user interface between the program guide application and the non-program-guide applications. The user may select certain non-program-guide applications as favorites and may set parental controls for certain non-program-guide applications. While the non-program-guide application operates, the program guide may check for events that require immediate attention. When such an event is detected, operation of the non-program-guide application may be suspended and the user may be asked whether the detected event should take place or whether operation of the non-program-guide application should be resumed. The program application interface may perform authentication and access rights determination functions. Reminders may be set for the content of non-program-guide applications.

48 Claims, 40 Drawing Sheets

(51) Int. Cl.
*H04N 21/462* (2011.01)
*H04N 21/472* (2011.01)
*H04N 21/4725* (2011.01)
*H04N 21/478* (2011.01)
*H04N 21/4782* (2011.01)
*H04N 21/482* (2011.01)
*H04N 21/81* (2011.01)
*H04N 5/60* (2006.01)

(52) U.S. Cl.
CPC ..... *H04N21/47202* (2013.01); *H04N 21/4725* (2013.01); *H04N 21/47815* (2013.01); *H04N 21/4782* (2013.01); *H04N 21/4821* (2013.01); *H04N 21/8173* (2013.01); *H04N 5/60* (2013.01)
USPC .......................................... 725/58; 715/700

(56) References Cited

U.S. PATENT DOCUMENTS

| | | |
|---|---|---|
| 3,493,674 A | 2/1970 | Houghton |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,162,516 A | 7/1979 | Becker |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,270,145 A | 5/1981 | Farina |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,337,480 A | 6/1982 | Bourassin et al. |
| 4,337,482 A | 6/1982 | Coutta |
| 4,337,483 A | 6/1982 | Guillou |
| 4,344,090 A | 8/1982 | Belisomi et al. |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,581 A | 1/1984 | Schweppe et al. |
| 4,429,385 A | 1/1984 | Cichelli et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kru/ ger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,523,228 A | 6/1985 | Banker |
| 4,533,910 A | 8/1985 | Sukonick et al. |
| 4,536,791 A | 8/1985 | Campbell et al. |
| 4,547,804 A | 10/1985 | Greenberg |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,620,229 A | 10/1986 | Amano et al. |
| 4,622,545 A | 11/1986 | Atkinson |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,706,121 A | 11/1987 | Young |
| 4,712,105 A | 12/1987 | Kohler |
| RE32,632 E | 3/1988 | Atkinson |
| 4,748,618 A | 5/1988 | Brown et al. |
| 4,750,036 A | 6/1988 | Martinez |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,821,102 A | 4/1989 | Ichikawa et al. |
| 4,829,558 A | 5/1989 | Welsh |
| 4,847,604 A | 7/1989 | Doyle |
| 4,847,700 A | 7/1989 | Freeman |
| 4,862,268 A | 8/1989 | Campbell et al. |
| 4,873,623 A | 10/1989 | Lane et al. |
| 4,884,223 A | 11/1989 | Ingle et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,908,707 A | 3/1990 | Kinghorn |
| 4,908,713 A | 3/1990 | Levine |
| 4,914,517 A | 4/1990 | Duffield |
| 4,914,732 A | 4/1990 | Henderson et al. |
| 4,931,783 A | 6/1990 | Atkinson |
| 4,935,865 A | 6/1990 | Rowe et al. |
| 4,937,821 A | 6/1990 | Boulton |
| 4,939,507 A | 7/1990 | Beard et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,995,078 A | 2/1991 | Monslow et al. |
| 5,008,853 A | 4/1991 | Bly et al. |
| 5,014,125 A | 5/1991 | Pocock et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,103,314 A | 4/1992 | Keenan |
| 5,148,154 A | 9/1992 | MacKay et al. |
| 5,151,782 A | 9/1992 | Ferraro |

(56) References Cited

U.S. PATENT DOCUMENTS

| | | |
|---|---|---|
| 5,151,789 A | 9/1992 | Young |
| 5,155,806 A | 10/1992 | Hoeber et al. |
| 5,157,768 A | 10/1992 | Hoeber et al. |
| 5,177,604 A | 1/1993 | Martinez |
| 5,195,092 A | 3/1993 | Wilson et al. |
| 5,206,722 A | 4/1993 | Kwan |
| 5,210,611 A | 5/1993 | Yee et al. |
| 5,214,622 A | 5/1993 | Nemoto et al. |
| 5,220,420 A | 6/1993 | Hoarty et al. |
| 5,223,924 A | 6/1993 | Strubbe |
| 5,231,493 A | 7/1993 | Apitz |
| RE34,340 E | 8/1993 | Freeman |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,239,540 A | 8/1993 | Rovira et al. |
| 5,247,347 A | 9/1993 | Litteral et al. |
| 5,247,364 A | 9/1993 | Banker et al. |
| 5,253,066 A | 10/1993 | Vogel |
| 5,253,067 A | 10/1993 | Chaney et al. |
| 5,283,819 A | 2/1994 | Glick et al. |
| 5,323,240 A | 6/1994 | Amano et al. |
| 5,335,277 A | 8/1994 | Harvey et al. |
| 5,353,121 A | 10/1994 | Young et al. |
| 5,357,276 A | 10/1994 | Banker et al. |
| 5,367,316 A | 11/1994 | Ikezaki |
| 5,382,983 A | 1/1995 | Kwoh et al. |
| 5,387,945 A | 2/1995 | Takeuchi |
| 5,404,393 A | 4/1995 | Remillard |
| 5,410,326 A | 4/1995 | Goldstein |
| 5,477,262 A | 12/1995 | Banker et al. |
| 5,479,268 A | 12/1995 | Young et al. |
| 5,481,542 A | 1/1996 | Logston et al. |
| 5,483,278 A | 1/1996 | Strubbe et al. |
| 5,485,221 A | 1/1996 | Banker et al. |
| 5,523,796 A | 6/1996 | Marshall et al. |
| 5,528,304 A | 6/1996 | Cherrick et al. |
| 5,532,754 A | 7/1996 | Young et al. |
| 5,559,548 A | 9/1996 | Davis et al. |
| 5,559,549 A | 9/1996 | Hendricks et al. |
| 5,583,560 A | 12/1996 | Florin et al. |
| 5,585,866 A | 12/1996 | Miller et al. |
| 5,589,892 A | 12/1996 | Knee et al. |
| 5,594,509 A | 1/1997 | Florin et al. |
| 5,596,373 A | 1/1997 | White et al. |
| 5,600,364 A | 2/1997 | Hendricks et al. |
| 5,600,573 A | 2/1997 | Hendricks et al. |
| 5,621,456 A | 4/1997 | Florin et al. |
| 5,635,978 A | 6/1997 | Alten et al. |
| 5,635,979 A | 6/1997 | Kostreski et al. |
| 5,650,826 A | 7/1997 | Eitz |
| 5,659,350 A | 8/1997 | Hendricks et al. |
| 5,663,757 A | 9/1997 | Morales |
| 5,677,708 A | 10/1997 | Matthews, III et al. |
| 5,682,195 A | 10/1997 | Hendricks et al. |
| 5,689,799 A | 11/1997 | Dougherty et al. |
| 5,699,107 A | 12/1997 | Lawler et al. |
| 5,734,853 A | 3/1998 | Hendricks et al. |
| 5,740,549 A | 4/1998 | Reilly et al. |
| 5,760,821 A | 6/1998 | Ellis et al. |
| 5,771,064 A | 6/1998 | Lett |
| 5,781,246 A | 7/1998 | Alten et al. |
| 5,798,785 A | 8/1998 | Hendricks et al. |
| 5,801,787 A | 9/1998 | Schein et al. |
| 5,808,608 A | 9/1998 | Young et al. |
| 5,835,843 A | 11/1998 | Haddad |
| 5,848,352 A | 12/1998 | Dougherty et al. |
| 5,850,218 A | 12/1998 | LaJoie et al. |
| 5,874,985 A | 2/1999 | Matthews, III |
| 5,897,623 A | 4/1999 | Fein et al. |
| 5,907,323 A | 5/1999 | Lawler et al. |
| 5,914,746 A | 6/1999 | Matthews, III et al. |
| 5,959,688 A | 9/1999 | Schein et al. |
| 5,990,927 A * | 11/1999 | Hendricks et al. ............ 725/132 |
| 6,163,316 A * | 12/2000 | Killian .......................... 715/721 |
| 6,172,677 B1 | 1/2001 | Stautner et al. |
| 6,177,931 B1 | 1/2001 | Alexander et al. |
| 6,188,995 B1 * | 2/2001 | Garst et al. ...................... 705/59 |
| 6,208,799 B1 | 3/2001 | Marsh et al. |
| 6,209,025 B1 | 3/2001 | Bellamy |
| 6,230,325 B1 | 5/2001 | Iinuma et al. |
| 6,240,555 B1 | 5/2001 | Shoff et al. |
| 6,263,501 B1 | 7/2001 | Schein et al. |
| 6,282,714 B1 | 8/2001 | Ghori et al. |
| 6,313,851 B1 | 11/2001 | Matthews, III et al. |
| 6,317,885 B1 | 11/2001 | Fries |
| 6,388,714 B1 * | 5/2002 | Schein et al. ................. 348/563 |
| 6,408,437 B1 | 6/2002 | Hendricks et al. |
| 6,469,753 B1 | 10/2002 | Klosterman et al. |
| 6,505,348 B1 | 1/2003 | Knowles et al. |
| 6,510,557 B1 | 1/2003 | Thrift |
| 6,600,503 B2 | 7/2003 | Stautner et al. |
| 6,665,869 B1 | 12/2003 | Ellis et al. |
| 6,668,278 B1 * | 12/2003 | Yen et al. ...................... 709/218 |
| 6,717,590 B1 | 4/2004 | Sullivan |
| 6,725,461 B1 * | 4/2004 | Dougherty et al. ............. 725/40 |
| 6,732,179 B1 * | 5/2004 | Brown et al. ................. 709/229 |
| 6,735,487 B1 | 5/2004 | Marshall et al. |
| 6,772,433 B1 * | 8/2004 | LaJoie et al. ..................... 725/52 |
| 6,863,522 B2 | 3/2005 | Boneberg et al. |
| 6,978,473 B1 | 12/2005 | Nsonwu et al. |
| 7,062,777 B2 | 6/2006 | Alba et al. |
| 7,464,393 B2 | 12/2008 | Westlake et al. |
| 7,546,621 B2 | 6/2009 | La Joie et al. |
| 7,624,410 B2 | 11/2009 | Ellis et al. |
| 7,805,742 B2 | 9/2010 | Ellis et al. |
| 7,873,737 B2 | 1/2011 | Brown et al. |
| 8,046,801 B2 | 10/2011 | Ellis et al. |
| 8,255,952 B2 | 8/2012 | Boylan, III et al. |
| 2002/0059599 A1 | 5/2002 | Schein et al. |
| 2002/0116712 A1 | 8/2002 | Schein et al. |
| 2003/0009758 A1 | 1/2003 | Townsend et al. |
| 2003/0035007 A1 * | 2/2003 | Wugofski ...................... 345/764 |
| 2005/0015804 A1 | 1/2005 | LaJoie et al. |
| 2005/0028208 A1 * | 2/2005 | Ellis et al. ........................ 725/58 |
| 2005/0044565 A1 | 2/2005 | Jerding et al. |
| 2005/0177850 A1 * | 8/2005 | Boylan et al. .................... 725/53 |
| 2005/0235319 A1 * | 10/2005 | Carpenter et al. .............. 725/52 |
| 2006/0123447 A1 * | 6/2006 | Westlake et al. ................ 725/40 |
| 2006/0157217 A1 | 7/2006 | Bassi |
| 2008/0184301 A1 * | 7/2008 | Boylan et al. .................... 725/40 |
| 2008/0271159 A1 | 10/2008 | Brown et al. |
| 2009/0049483 A1 | 2/2009 | Townsend et al. |
| 2009/0241144 A1 | 9/2009 | LaJoie et al. |
| 2011/0099573 A1 | 4/2011 | Ellis et al. |
| 2011/0209180 A1 | 8/2011 | Ellis et al. |

FOREIGN PATENT DOCUMENTS

| | | |
|---|---|---|
| CA | 2337464 A1 | 2/2000 |
| DE | 29 18 846 | 11/1980 |
| DE | 3246225 A1 | 6/1984 |
| DE | 3337204 | 4/1985 |
| DE | 36 21 263 A1 | 1/1988 |
| EP | 0337336 A2 | 10/1989 |
| EP | 0 393 555 | 10/1990 |
| EP | 0396062 A2 | 11/1990 |
| EP | 0401930 | 12/1990 |
| EP | 0408892 A1 | 1/1991 |
| EP | 0420123 A2 | 4/1991 |
| EP | 0 477 754 A2 | 4/1992 |
| EP | 0477756 A2 | 4/1992 |
| EP | 0 492 853 A2 | 7/1992 |
| EP | 0532322 A2 | 3/1993 |
| EP | 0 572 090 | 12/1993 |
| EP | 0 575 956 A2 | 12/1993 |
| EP | 0721253 A2 | 7/1996 |
| EP | 0827340 A2 | 3/1998 |
| EP | 0854645 A2 | 7/1998 |
| EP | 1 330 125 A2 | 7/2003 |
| EP | 2 268 019 A2 | 12/2010 |
| FR | 2662895 A1 | 12/1991 |
| GB | 2034995 A | 6/1980 |

(56) References Cited

FOREIGN PATENT DOCUMENTS

| | | |
|---|---|---|
| GB | 2126002 A | 3/1984 |
| GB | 2185670 A | 7/1987 |
| GB | 2256546 A | 12/1992 |
| JP | 58137334 A | 8/1983 |
| JP | 58196738 A | 11/1983 |
| JP | 59141878 A | 8/1984 |
| JP | 61-74476 | 4/1986 |
| JP | 2-48879 | 2/1990 |
| JP | 61-50470 A | 5/1994 |
| JP | 6260384 A | 9/1994 |
| WO | WO-86/01962 | 3/1986 |
| WO | WO-88/04507 | 6/1988 |
| WO | WO 89/12370 | 12/1989 |
| WO | WO-90/01243 | 2/1990 |
| WO | WO-90/15507 | 12/1990 |
| WO | WO-91/18476 | 11/1991 |
| WO | WO-92/04801 | 3/1992 |
| WO | WO-9305452 | 3/1993 |
| WO | WO-93/11638 | 6/1993 |
| WO | WO-93/11639 | 6/1993 |
| WO | WO-95/01056 | 1/1995 |
| WO | WO 95/07003 | 3/1995 |
| WO | WO 95/32585 | 11/1995 |
| WO | WO 96/09721 | 3/1996 |
| WO | WO 96/34466 | 10/1996 |
| WO | WO 96/34467 | 10/1996 |
| WO | WO 96/34491 | 10/1996 |
| WO | WO 96/41471 | 12/1996 |
| WO | WO 96/41478 | 12/1996 |
| WO | WO 97/13368 | 4/1997 |
| WO | WO 97/18675 | 5/1997 |
| WO | WO 97/31480 | 8/1997 |
| WO | WO 97/42763 | 11/1997 |
| WO | WO 97/48230 | 12/1997 |
| WO | WO 97/49237 | 12/1997 |
| WO | WO 97/49242 | 12/1997 |
| WO | WO 98/06219 | 2/1998 |
| WO | WO 98/16028 | 4/1998 |
| WO | WO 98/17064 | 4/1998 |
| WO | WO-98/26584 | 6/1998 |
| WO | WO 99/13641 | 3/1999 |
| WO | WO-0005889 A1 | 2/2000 |
| WO | WO-00/28734 | 5/2000 |

OTHER PUBLICATIONS

Hartwig, S., "Softwarearchitekturen für interaktive digitale Decoder," Fernseh -und Kino-Technik, 50(3):92-94, 96-98, 100-102 (Mar. 1996) (concise explanation included in Supp. IDS).
Hirtz, G., et al., "Open TV: Betriebssystem für interaktives Fernsehen," Fernseh- Und Kino- Technik, 50, No. 3, (Mar. 1996) pp. 84-89.
Rath, K., et al., "Set-Top Box Control Software: A Key Component in Digital Video," Philips J., Res. 50 (1996) pp. 185-199.
Williams, T., "STB operating systems gear up for flood of data services," Computer Design, Feb. 1996, pp. 67, 68, 72, 74-76, 78, and 80.
"A New Approach to Addressability," CableData product brochure, undated.
"Creation/Modification of the Audio Signal Processor Setup for a PC Audio Editor," IBM Technical Disclosure Bulletin, vol. 30, No. 10, Mar. 1988, pp. 367-376.
"D2B-Home Bus für Audio and Video," Selektor, No. 4, Apr. 1990, pp. 10, 12.
"Interactive Computer Conference Server," IBM Technical Disclosure Bulletin, vol. 34, No. 7A, Dec. 1991, pp. 375-377.
"Interface Device for Conventional TVs to Improve Functionality," IBM Technical Disclosure Bulleting, Vo. 36, No. 7, Jul. 1993, pp. 53-54.
"Learning Considerations in User Interface Design: The Room Model," Patrick P. Chan, publication of the Software Portability Laboratory, University of Waterloo, Waterloo, Ontario, Canada, Jul. 1984.
"MSI Datacasting Systems," TV Communications Journal, Jan. 1973.
"The New Media and Broadcast Policy: An Investigation & Research Conference Report on Broadcasting Diversification," Japan Ministry of Posts & Telecommunications, Mar. 1982.
"Videotoken Network New Dimension Television" (Plaintiffs Exhibit 313).
"Westar and Videotoken Network Present the TableComputer" (Plaintiffs Exhibit 324).
Antonof, "Stay Tuned for Smart TV," Popular Science, Nov. 1990, pp. 62-65.
Author unknown, "Facsimile Transmission," NHK Research Monthly Report, Dec. 1987.
Baer, R.H., "Innovative Add-On TV Products," IEEE Transactions on Consumer Electronics, vol. CE-25, Nov. 1979, pp. 765-771.
Bensch, "VPV Videotext Programs Videorecorder," IEE Paper, Jun. 1988, pp. 788-792.
Bestler, "Flexible Data Structure and Interface Rituals for Rapid Development of OSD Applications," 42nd Annual Convention and Exposition of the NCTA, Jun. 6, 1993, San Francisco, CA, p. 223-236.
Brugliera, Vito, "Digital On-Screen Display—A New Technology for the Consumer Interface," Symposium Record Cable Sessions of the 18th International Television Symposium & Technical Exhibition, Jun. 1993, pp. 571-586.
Bureau of Science & Technology (Japan), "Computer Network: Current Status and Outlook on Leading Science and Technology," vol. 1, Dec. 1986.
CableComputer User's Guide, bearing a date of Dec. 1985 (Plaintiffs Exhibit 289).
CableData, Roseville Consumer Presentation, Mar. 1986.
CableVision Advertisement for "TV Decisions," Aug. 1986.
Carne, E.B., "The Wired Household," IEEE Spectrum, Oct. 1979, pp. 61-66.
Chirstodoulakis et al., "Browsing Within Time-Driven Multimedia Documents," publication of the Institute for Computer Research, University of Waterloo, Waterloo, Ontario, Canada, Jul. 1988, pp. 219-227.
Damouny, N.G., "Telextext Decoders—Keeping Up With the Latest Advances," IEEE Transactions on Consumer Electroncis, vol. CE-30, No. 3, Aug. 1984, pp. 429-435.
Edwardson et al., "CEEFAX: A Proposed New Broadcasting Ser.," Journal of the SMPTE, Jul. 1974, pp. 14-19.
Hedger, J., "Telesoftware: Home Computing Via Broadcast Teletext," IEE Transactions on Consumer Electronics, vol. CE-25, No. 3, Jul. 1979, pp. 279-287.
Hirodata et al., "Impact: An Interactive Natural-Motion-Picture Dedicated Multimedia Authoring System," Communications of the ACM, Mar. 1991, pp. 343-350.
Hiroshi Ishii et al., "Clearface: Translucent Multiuser Interface for TeamWorkStation," ECSCW, Sep. 1991, pp. 6-10.
Hiroshi Ishii et al., "Toward an Open Shared Workspace: Computer and Video Fusion Approach of TeamWorkStation," Communications of the ACM, Vo. 34, No. 12, Dec. 1991, pp. 37-50.
James, A., "Oracle—Broadcasting the Written Word," Wireless World, Jul. 1973, pp. 314-316.
Japan Mechanical Engineering Organization Int'l Society for the Advancement of Image Software, "Technological Examination & Basic Investigative Research Report on Image Databases," Japan, Mar. 1988.
Jerrold Communications Publication, "Cable Television Equipment," dated 1992 and 1993, pp. 8-2.1 to 8-6 and 8-14.1 to 8-14.3.
Joseph Roizen, "Teletext in the USA," Society of Motion Picture and Television Engineers Journal, Jul. 1981, pp. 602-610.
Judice, C.N., "Move Over Cable, Here Comes Video Via Voice Lines," Network World, Sep. 1986, p. 26.
Karstad, K., "Microprocessor Control for Color-TV Receivers," IEEE Transactions on Consumer Electronics, vol. CE-26, May 1980, pp. 149-155.
Lowenstein et al., "Technology Review," vol. 88, Oct. 1985, p. 22.
M/A-COM, Inc., Videocipher II Satellite Descrambler Owner's Manual, dated prior to Feb. 1986.

(56) References Cited

OTHER PUBLICATIONS

Mannes, G., "Smart Screens; Development of Personal Navigation Systems for TV Viewers," Video Magazine, Dec. 1993.
McKenzie, G.A., "Oracle—An Information Broadcasting Service Using Data Transmission in the Vertical Interval," Journal of the SMPTE, Jan. 1974, pp. 6-10.
Michael Alexander, "Visualizing cleared-off desktops," Computerworld, May 6, 1991, p. 20.
*Preview Guide Brochure, Spring 1994.*
Rayers, D.J., "Telesoftware by Teletext," 1984 IEEE Conf. Papers, vol. 240, p. 323.
Schlender, "Couch Potatoes! Now It's Smart TV," Fortune, No. 20, 1989, pp. 111-116.
Sealfon, Peggy, "High Tech TV," Photographic, Dec. 1984.
Starsight CB1500 customer letter, "Getting Started" Installation Guide, "Using Starsight" Manual, and Remote Control "Quick Reference Guide," 1994.
Starsight Interactive Television Guide, Phase III, Palo Alto. Apr. 11, 1997.
Sunada et al., "Teletext Color Television Receiver Model C-29M950, C26M940," NEC Home Electroncis, NEC Giho, 1987.
Trial Testimony of Mr. Michael F. Axford, Reporter's Transcript of Proceedings Held on May 9, 1998 for *Prevue Interactive, Inc. and United Video Satellite Group, Inc.* vs. *Starsight Telesight, Inc.*, pp. 186-187, 296-315, and 352-357.
Veith, R.H., "Television's Teletext," Elsevier Science Publishing Co., Inc., 1983, pp. 13-20, 41-51.
Videotext Programmiert Videorecorder, Rundfunktech Mitteilungen, Broadcast Engineering Reports, vol. 26, Nov.-Dec. 1982.
W. Leo Hoarty, "Multimedia on Cable Television Systems," 18th International Television Sumposum and Technical Exhibition, Montreux, Switzerland, May 10, 1993, pp. 555-567.
Buehl, J., "Navigation Service Requirements for Advanced Television," printed from the Internet at http://www.pioneerdigital.com/papers/navig.htm on May 5, 1999.
Case 4:11-cv-06591-PJH, Complaint for Declaratory Relief (plaintiff), dated Dec. 21, 2011, 16 pages.
Davis, TV Guide on Screen, "Violence on Television," House of Representatives, Committee on Energy and Commerce, Subcommittee on Telecommunications and Finance, pp. 93-163, Jun. 25, 1993.
Dinwiddie et al., "Combined-User Interface for Computers, Television, Video Recorders, and Telephone, etc.," IBM Technical Disclosure Bulletin, vol. 33, No. 3B, Aug. 1990, pp. 116-118.
Hitachi Consumer Electronics Co., Ltd., Certification of market introduction in 1993 of Hitachi Projection TV Model 55EX7K.
Hitachi Service Manual, No. 0021, Projection Color Television, Models 55EX7K, 50EX6K, 50ES1B/K, 46EX3B/4K, and 46EX3BS/4KS, Aug. 1993.
Hoarty, W. Leo, "Multimedia on Cable Television Systems," Symposium Record Cable TV Sessions, 18th International Television Symposium and Technical Exhibition, Montreux, Switzerland, Jun. 10-15, 1993, pp. 555-567.
JVC Service Manual, 27" Color Monitor/Receiver, Model AV-2771S (U.S.), Jul. 1991.
Roizen, Joseph, "Teletext in the USA," Society of Motion Picture and Television Engineers Journal, Jul. 1981, pp. 602-610.
Tech Notes: Product Updates from M/A-COM Cable Home Group, "Videocipher Owner's Manual Update," Issue No. 6, Feb. 1986.
Uniden, UST-4800 Super, Integrated Receiver/Descrambler, Preliminary Reference Manual, Nov. 12, 1991, 80 pages.
Uniden, UST-4800, Integrated Receiver/Descrambler, Installation Guide, © 1990, Uniden America Corporation, 60 pages.
Uniden, UST-4800, Integrated Receiver/Descrambler, Operating Guide, © 1990, Uniden America Corporation, 24 pages.
VTN "Videotoken Network, New Dimension Television," Rev. 1, Dec. 1985 (Plaintiff's Exhibit 313).
Merrell, "Tac Timer," 1986 NCTA Technical Papers, pp. 203-206. (Resubmitted).

\* cited by examiner

|  | 8:00 | 8:30 | 9:00 |
|---|---|---|---|
| 23 TBS | PROGRAM1 | PROGRAM 2 ||
| VOD 1 | PROGRAM 3 |||
| VOD 2 | PROGRAM 4 |||
| 46 A+E | PROGRAM 5 | PROGRAM 6 ||

INTERACTIVE PROGRAM GUIDE SYSTEM PROVIDING AN APPLICATION PROGRAM INTERFACE FOR NON-PROGRAM GUIDE APPLICATIONS

This application is a continuation of U.S. patent application Ser. No. 09/346,134, filed Jul. 16, 1999 now abandoned, which claims the benefit of U.S. provisional application No. 60/093,865, filed Jul. 23, 1998.

BACKGROUND OF THE INVENTION

This invention relates to interactive television program guide systems. More particularly, this invention relates to interactive television program guide systems having a program guide application that serves as a portal for other applications.

Interactive television program guides are well known. Such guides, which are typically implemented on set-top boxes, allow users to view television program listings on their home televisions. Typical program guides allow users to view information for television programs and channels and audio programs and channels. For example, a program guide may provide information on regular television channels, premium television channels, pay-per-view television channels, and music channels. A variety of display formats are typically supported. For example, program listings may be organized by time, by channel, and by category (sports, children, comedy, movies, etc.).

Future set-top box systems may include access to services that are rarely or never provided by current program guides, such as video-on-demand, home shopping, Internet web browsing, electronic mail, banking, enhanced television (interactive programs), data services, and wagering services.

In currently envisioned systems each of these non-program-guide services would be provided as a separate application loaded into the same set-top-box as the program guide. A menu structure or other common interface might be provided to allow the user to launch a given one of the applications. However, there would be no commonality between the user interfaces provided by the program guide application and non-program guide applications. This could lead to user confusion, particularly with users who are not necessarily computer literate. Overlap between applications might not be exploited and code and data might be duplicated among the applications.

It is therefore an object of the present invention to provide a program guide system in which an interactive television program guide application has the capability to serve as a portal for other applications. By acting as a portal, the program guide application may ensure a common user interface, may eliminate resource contention, and may reduce the amount of code and data required by each application.

It is also an object of the present invention to provide ways in which to facilitate the use of multiple applications such as a program guide application and non-program-guide applications.

SUMMARY OF THE INVENTION

These and other objects of the invention are accomplished in accordance with the principles of the present invention by providing an interactive television program guide system having an interactive television program guide application that serves as a portal for other applications. The interactive television program guide application and other applications may be implemented on any suitable platform. One suitable platform is user television equipment that is based on a set-top box or that is based on a device that incorporates set-top box functions such as an advanced digital television receiver. Another suitable platform involves a client-server architecture based on a server and user television equipment. The server, which may be located at a cable system headend or other suitable remote location, operates in cooperation with the user television equipment. With such client-server arrangements, interactive program guides and other applications that are implemented on the platform are partially implemented on the user television equipment and partially on the server, rather than being implemented entirely on the set-top box. For example, program guide functions related to displaying menu screens may be implemented at the user television equipment, whereas functions related to maintaining the program guide database or related to video-on-demand features may be implemented on the server.

An application program interface (API) for the program guide is provided. The application program interface may allow non-program-guide applications to access program guide functions. The API may also coordinate access to platform resources (e.g., set-top box resources and/or server resources) such as on-screen display resources, remote control key resources, set-top box front-panel resources, communications channel resources, memory function resources, etc. by the program guide and the non-program-guide applications. The API may allow non-program-guide applications to make use of program guide functions such as tuning, parental control, favorites, user profiles, drawing, highlighting and on-screen navigation, database access, and purchasing. This approach ensures that a common user interface is used, resource contention is eliminated, and the amount of code and data required by each application is reduced.

The API helps coordinate the use of applications that are located remote from the set-top box, such as applications located on a server at a cable system headend or at a server on the Internet. The API may also perform authentication functions. This helps ensure that only authorized applications are provided with access to desired functions such as certain program guide functions. Different access rights may be given to different applications.

Non-program-guide applications may provide interactive content in the form of an interactive component that is associated with a television programming (e.g., a given television program, a television channel, or the like). For example, a non-program-guide application may provide interactive sports content for a sports channel or interactive home shopping content for a home shopping channel. The interactive content may be in the form of a shopping experience, information services, games, or any other type of suitable interactive content associated with a given television channel, service, program, program type, or program listings. A non-program-guide application that provides an interactive component for a given channel may be delivered to a user's set-top box along with video and audio programming. The interactive television program guide application may alert the user to the presence of the interactive component. One suitable indicator is an icon that may be presented as a overlay on top of the current television channel. Another suitable indicator is an icon or other display element that may be provided as part of a program guide display screen.

The interactive television program guide application may be used to launch non-program-guide applications. For example, the program guide application may provide an on-screen option to launch a particular non-program-guide application. The user may also activate a dedicated button such as a "launch" remote control button.

Applications and other interactive content may also be incorporated directly into the program listings displayed by the interactive television program guide application. For example, video-on-demand programming may be made available to the user with a video-on-demand application. The interactive television program guide application may incorporate selectable video-on-demand program listings into the program guide display screens provided by the interactive television program guide application. When the user selects a given video-on-demand program listing, the interactive television program guide application may launch the video-on-demand application and direct the video-on-demand application to play the video for the selected listing or to begin the processing necessary to authorize the delivery of that video.

Other interactive content, such as audio-on-demand, data from information services, web pages, shopping information, horse racing or other wagering, and the like may also be handled by integrated selectable buttons provided on certain program guide display screens as overlays on top of television programs, etc. A selectable option that allows a non-program-guide application to be invoked from within the interactive television program guide application and directed to take an action related to a current television program, program listing, service, etc. is called a hot link. A selectable hot link related to a currently displayed television program provides a way to launch a non-program-guide application while directing the launched application to take an action that is related to the current television program. For example, a user may be watching a sports program. Selecting a hot link to a home shopping application launches the home shopping application and directs the home shopping application to present products to the user that are related to sports.

The user may be allowed to set certain non-program-guide applications as favorites. For example, the interactive television program guide application may display these selected favorite applications in a list when directed by the user, may restrict the movement of a highlight region to just those favorite applications when the user navigates within a larger list of non-program-guide applications, or may otherwise use the information on which applications have been designated as favorites.

The user may also be allowed to set parental controls for certain non-program-guide applications. This allows the user to lock applications such as shopping or video-on-demand. A viewer may unlock such parentally controlled applications by entering a predefined user-selected parental control password or using any other suitable parental control unlocking technique.

The user may also be allowed to set reminders for the content associated with various applications. For example, the user may be allowed to set reminders for specialized promotional segments associated with a home shopping application or the like. Reminders may also be set for chat sessions.

An application (e.g., the interactive television program guide application) may continue to run in the background while another application (e.g., a non-program-guide application) runs in the foreground. The background application may continually monitor events to determine when events occur that require immediate attention. For example, the interactive television program guide application may run in the background to monitor whether the user has pressed a remote control key that requires attention or whether a pre-scheduled program guide function such as a pre-set reminder requires attention. In situations such as these, the interactive television program guide application may terminate or suspend the operation of a non-program-guide application running in the foreground. If operation of the foreground application is suspended, the background application may display a message for the user asking whether the user wishes to resume the operation of the suspended application or whether the detected event (e.g., the event related to the user key press or prescheduled reminder or the like) should take place.

Further features of the invention, its nature and various advantages will be more apparent from the accompanying drawings and the following detailed description of the preferred embodiments.

BRIEF DESCRIPTION OF THE DRAWINGS

FIG. 17*b* is an illustrative program guide display screen of a program listings grid containing video-on-demand program listings in accordance with the present invention.

DETAILED DESCRIPTION OF THE PREFERRED EMBODIMENTS

Figure 1:
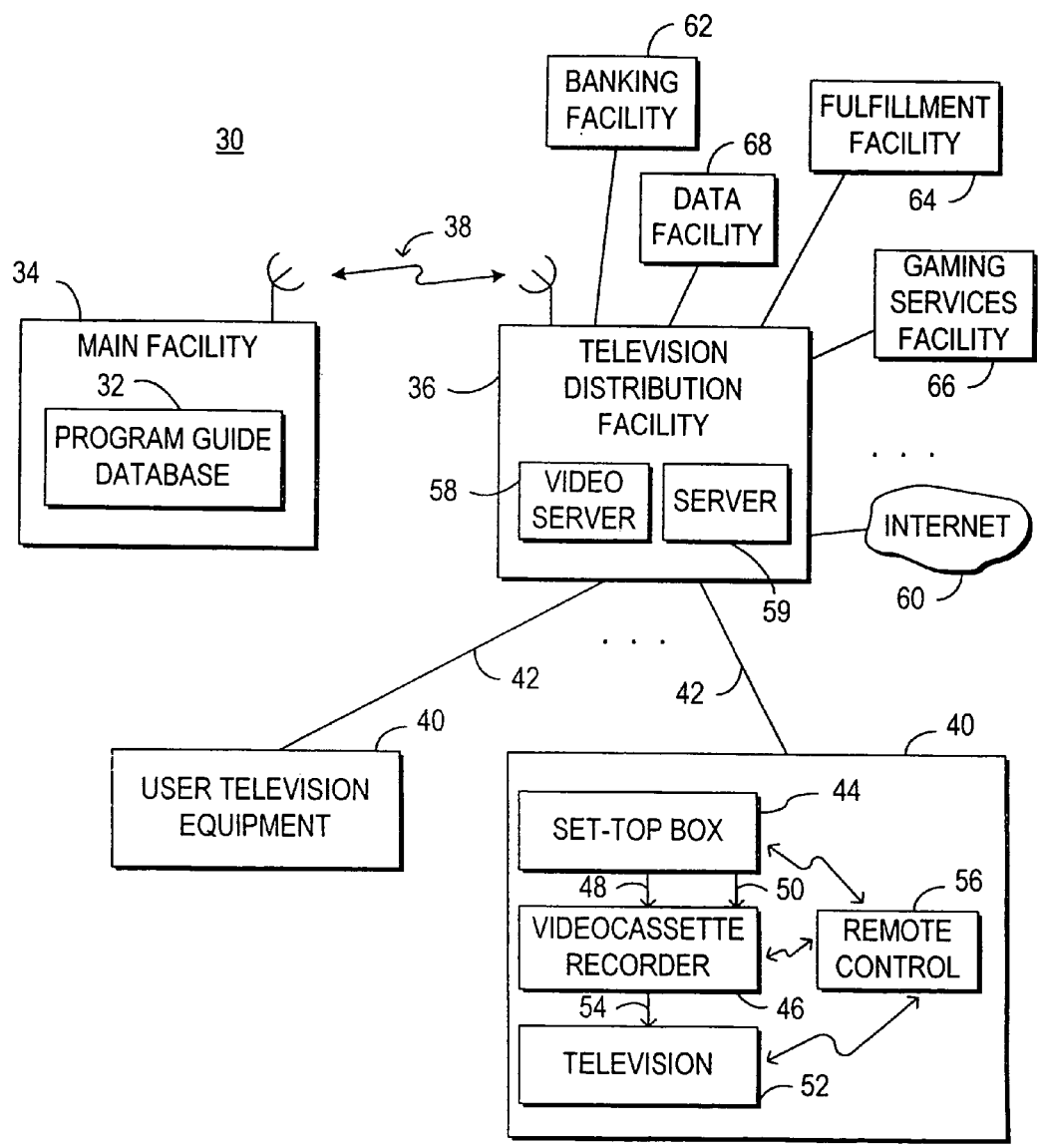
FIG. 1 is a diagram of an illustrative interactive television program guide system in accordance with the present invention.

An illustrative program guide system 30 in accordance with the present invention is shown in FIG. 1. Program guide data such as program listings, program descriptions, pay-per-view ordering information and the like may be stored in program guide database 32 of main facility 34. Main facility 34 distributes the program guide data to multiple television distribution facilities 36 via communications paths such as communications path 38. Television distribution facilities 36 may be broadcast television facilities, cable system headends, satellite distribution facilities, or other suitable television distribution facilities. Only one television distribution facility 36 is illustrated in FIG. 1 to avoid over-complicating the drawings. For clarity, the invention will be primarily discussed in connection with the use of one such television distribution facility. Communications path 38 may be any suitable communications path, such as a satellite link, cable, fiber-optic link, telephone link, the Internet, etc.

Each television distribution facility 36 has a number of associated users each of which has user television equipment 40 connected to television distribution facility 36 via one of communications paths 42. Communications paths 42 may be any suitable type of link suitable for supporting television programming and data. For example, if television distribution facility 36 is a cable system, communications paths 42 may be cable. Paths 42 are used to distribute television programming to user television equipment 40. The television signals distributed to user television equipment 40 may be analog or digital or both. Paths 42 are also used to distribute data such as program guide data to user television equipment 40. Data may be distributed using an in-band or out-of-band technique and may use digital or analog techniques. Data may be distributed continuously, periodically, or on-demand. Paths 42 are preferably bidirectional, so that functions such as impulse pay-per-view purchases from the program guide and client-server functions may be supported. When services other than program guide services are provided to the user, data may be provided over paths 42 that relates to such non-program-guide services.

As shown in FIG. 1, user television equipment 40 may contain a set-top box 44 connected to an optional videocassette recorder 46 or other recording device such as a digital video disc (DVD) player with recording capabilities or a digital storage device such as equipment containing a hard disk drive or the like. Set-top box 44 may receive television programming and data from television distribution facility 36 via communications path 42. An interactive television program guide and various non-program-guide applications may be implemented on set-top box 44.

Television programming from television distribution facility 36 and display screens generated by the applications on set-top box 44 may be provided to videocassette recorder 46 using communications path 48, which may be, for example, a cable or wire. Commands may be provided to videocassette recorder 46 from set-top box 44 using communications path 50, which may be an infrared link or other suitable communications path.

Videocassette recorder 48 may pass television programming from television distribution facility 36, display screens generated by set-top box 44, or video signals generated by playing a videocassette to television 52 via communications path 54. The user may view television programming and display screens on television 52 and may use television 52 (or an auxiliary audio system) to listed to music channels or other audio programs.

Set-top box 44, videocassette recorder 46, and television 52 may be controlled by remote control 56 or any other suitable user interface such as a mouse, trackball, wireless keyboard, voice recognition system, touchpad, dedicated keys, etc. If desired, other types of user television equipment 40, such as those based on personal computer televisions (PC/TVS) or advanced television receivers may be used instead of a configuration based on a set-top box. However, for clarity the present invention will be described primarily in connection with a set-top box arrangement. Moreover, different configurations may be used for distributing data to user television equipment 4C such as configurations in which program listings and other information may be distributed to user television equipment 40 without passing through television distribution facility 36 using paths that are separate from communications paths 42. For clarity, the present invention will be described primarily in connection with the illustrative data distribution arrangement shown in FIG. 1.

Television distribution facility 36 may contain a video server 58 to support video-on-demand applications. With such applications, videos that are stored on video server 58 may be requested by users at user television equipment 40. The videos may then be played back to the users over communications paths 42. A server 59 that is separate from or integrated with server 58 may also be provided if it is desired to implement applications such as the program guide application using a client-server architecture.

Applications such as program guide applications and non-program-guide applications may be implemented on any suitable platform. One suitable platform is user television equipment 40, which may be based on a set-top box or a device that incorporates set-top box functions such as an advanced digital television receiver, etc. Another suitable platform involves a client-server architecture based on a server 59 and user television equipment 40. Server 59 may be located at television distribution facility 36 or at another location remote from user television equipment 40. Server 59 operates in cooperation with user television equipment 40. In client-server arrangements, program guide data may be maintained in a database on server 59 and may be delivered to user television equipment 40 on demand. The program guide data maintained at server 59 may be distributed to server 59 for its database from program guide database 32 via communications link 38.

With client-server arrangements, interactive program guides and other applications that are implemented on the platform are partially implemented on user television equipment 40 and are partially implemented on server 59, rather than being implemented entirely on user television equipment 40. For example, program guide functions related to displaying menu screens may be implemented at user television equipment 40, whereas functions related to maintaining a program guide database at television distribution facility 36 may be implemented using server 59 and functions related to video-on-demand features may be implemented using server 58.

Web browser applications on set-top box 44 may allow the user to access the Internet 60. The Internet 60 may be either accessed directly (e.g., via a modem link) or via television distribution facility 36 (using, e.g., a cable modem link), as shown in FIG. 1. Other facilities and services that may be accessed directly or via television distribution facility 36 include banking services (using banking facility 62), shopping services (using fulfillment facility 64), wagering or gaming services (using gaming facility 66), and information and other services (using data facility 68).

Figure 2:
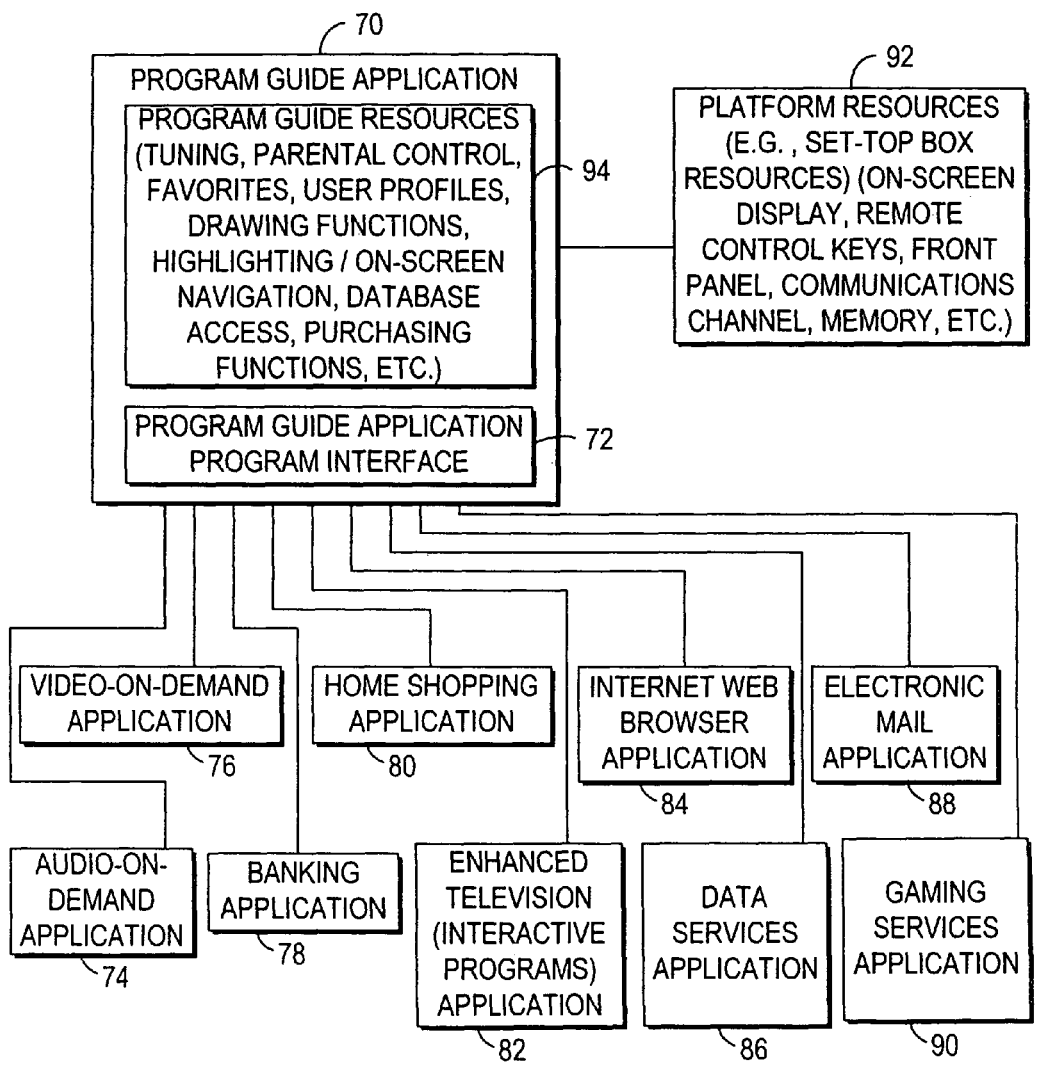
FIG. 2 is a diagram illustrating how the system may have an interactive television program guide application and a plurality of non-program-guide applications in accordance with the present invention.

As shown in FIG. 2, the program guide application 70 may have an associated program guide application program interface (API) 72, that allows program guide application 70 to serve as a portal for non-program-guide applications such as audio-on-demand application 74, video-on-demand application 76, home banking application 78, home shopping application 80, enhanced television application 82, Internet web browser application 84, data services application 86, electronic mail application 88, and gaming services application 90. A program guide system in which a program guide API is used is described in Ellis et al. U.S. patent application Ser. No. 09/145,232, which is hereby incorporated by reference herein in its entirety. Although depicted as being a part of program guide application 70 for purposes of illustration, program guide API 72 may be considered to be either a part of program guide application 70 or separate from application 70 yet associated with application 70. Program guide API 72 may be implemented partially on user television equipment 40 and partially on a server such as server 59 or may be implemented on user television equipment 40. For clarity, the functions of program guide API 72 will be described primarily in the context of arrangements in which program guide API 72 is implemented on user television equipment 40.

Moreover, although API 72 is primarily described herein as being associated with program guide application 70, the principles of the present invention also apply to systems in which application program interfaces are associated with other applications. For specificity and clarity the present invention is described primarily in the context of a program guide API. This is, however, merely illustrative.

In accordance with the present invention, use of program guide API 72 helps ensure that all access to applications other than the program guide application is made through the program guide. This assures that there is essentially only one user interface for the user to master. The user need not attempt to learn multiple user navigation paradigms or become familiar with dissimilar data presentation formats. The user need only become familiar with a single user interface.

Program guide API 72 has functions that allow the non-program-guide applications to access platform resources 92 such as on-screen display features (colors, fonts, etc.), remote control keys (key assignments and the like), front panel resources (which determine, e.g., the functions assigned to various dedicated buttons on user television equipment 40), communications channel resources (e.g., features related to how set-top box 22 sends and receives data), and server resources.

Program guide API 72 also has functions that allow applications to make use of program guide resources 94 such as tuning (how to change set-top box channels), parental control (features related to placing a password lock on certain channels or programs), favorites (e.g., user-designated favorite channels), user profiles (e.g., favorites and settings profiles for various users of a program guide on a given set-top box), drawing functions, highlighting and on-screen navigation, database access (e.g., to a database of program guide information stored in memory in set-top box 44 and periodically or continually supplied with program guide data from program guide database 32 of main facility 34), purchasing functions (e.g., for impulse ordering pay-per-view events), options on program guide display screens, etc.

Figure 3:
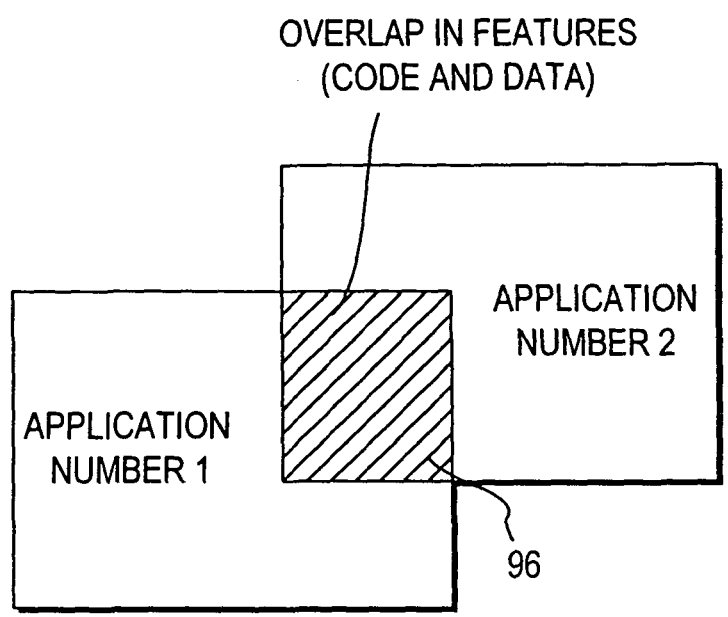
FIG. 3 is a diagram showing how two applications may have an overlap in features in accordance with the present invention.

Because the functions of program guide API 72 help coordinate access of non-program guide applications to platform resources 92 and program guide resources 94, resource contention may be eliminated and the amount of code and data required by each application may be reduced. A common user interface across applications may also be assured. As shown in FIG. 3, non-program guide application No. 1 and non-program guide application No. 2 may have an overlap in features 96. The shared code and data represented by overlap 96 are typically resident in memory in set-top box 44. Overlap 96 represents a savings in the overhead associated with implementing these features on set-top box 44.

Figure 4:
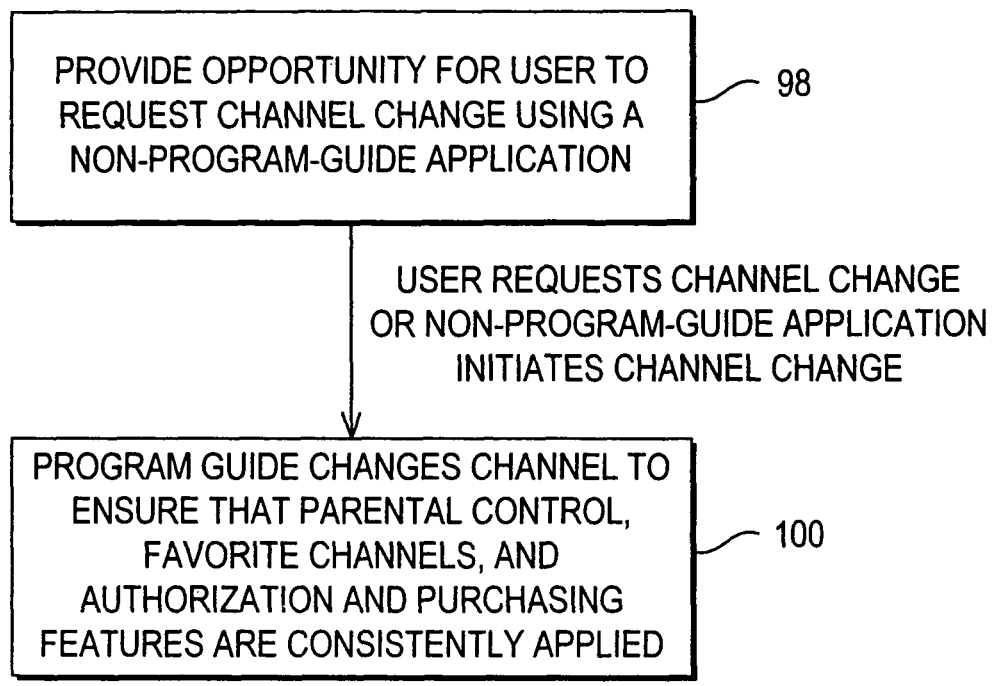
FIG. 4 is a flow chart showing steps involved in changing channels using the program guide in accordance with the present invention.

One example of using program guide application 70 to perform certain non-program-guide application functions involves the function of changing the channel to which set-top box 44 is tuned. Steps involved in this process are illustrated in FIG. 4. At step 98, the user is provided with an opportunity to request a channel change by one of the non-program-guide applications. The non-program guide application may also initiate a channel change (e.g., to direct a tuner to tune to an appropriate channel to collect data). After the user requests a channel change or the non-program-guide application initiates a channel change, program guide application 70 is used to change channels at step 100. As program guide application 70 changes the channel, it ensures that program guide features such as parental control, favorite channels, and authorization and purchasing features are consistently applied. This helps to ensure that a consistent user interface is maintained, because each of these features may operate nearly identically in each of the non-program-guide applications and in program guide application 70.

Figure 5:
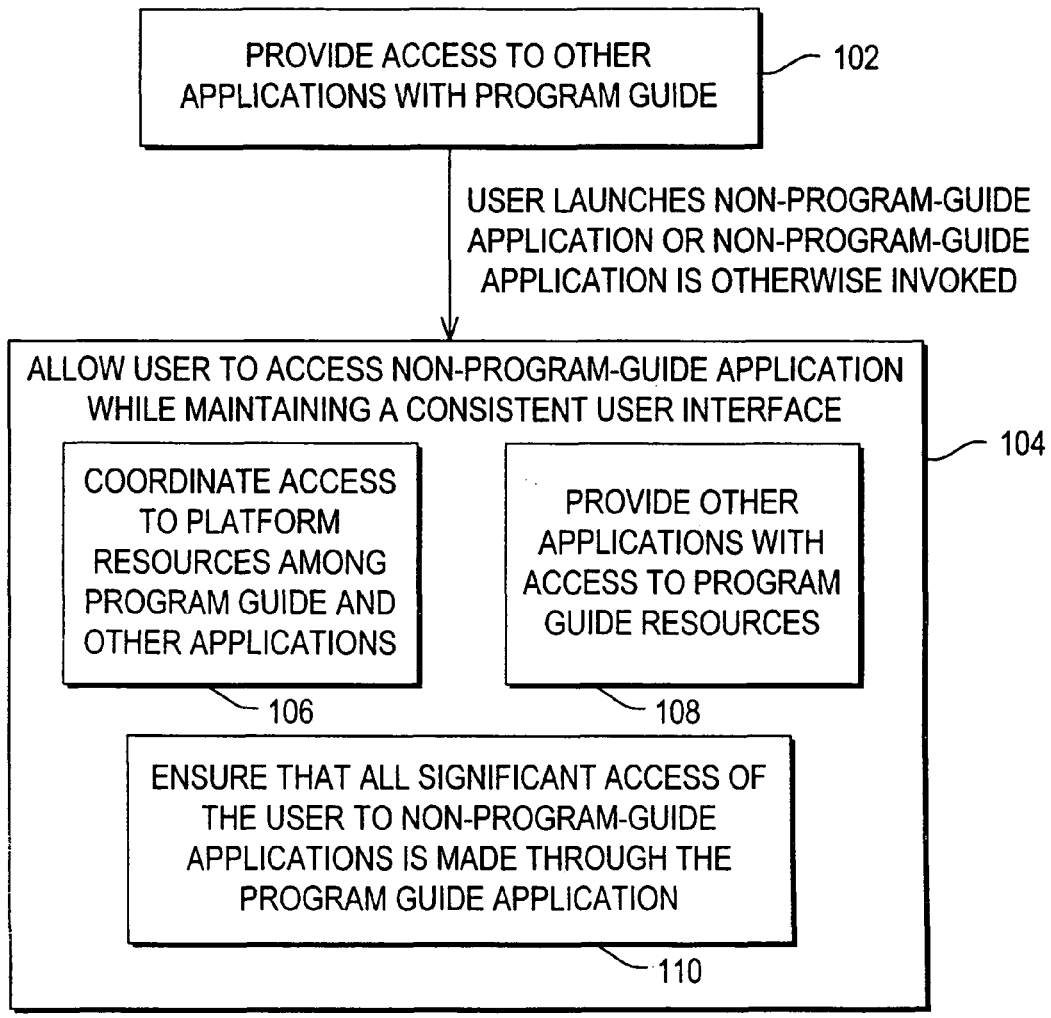
FIG. 5 is a flow chart of steps involved in using the program guide application program interface to maintain a consistent user interface when invoking non-program-guide applications with the program guide application in accordance with the present invention.

The program guide system of the present invention maintains a consistent user interface using program guide application 70 to perform certain non-program-guide application functions. Steps involved in maintaining a consistent user interface are shown in FIG. 5. At step 102, program guide application 70 provides access to non-program-guide applications. After a user launches a non-program guide application or a non-program guide application is otherwise invoked, program guide application 70 maintains a consistent user interface during operation of program guide application 70 and any non-program guide applications at step 104.

As shown in FIG. 5, the task of maintaining a consistent user interface at step 104 partly involves coordinating access to platform resources at substep 106 and partly involves providing non-program guide applications with access to program guide resources at substep 108. An example of step 108 is when the user needs to change channels on set-top box 44 using a non-program guide application. The program guide application coordinates access to the program guide tuning function, which ensures that parental control, favorite channels, and authorization and purchasing functions are consistent for all non-program-guide applications.

Another aspect of the task of maintaining a consistent user interface is the step of using program guide application 70 to ensure that all significant access of the user to non-program-guide applications is made through program guide application 70 (step 110). Step 110 may involve, for example, the step of only allowing access to those non-program-guide applications that use program guide resources to a significant extent or at least have operating characteristics equivalent to those normally provided by program guide application 70. Step 110 may also involve the task of providing certain functions in program guide application 70 that might nominally be provided in a non-program-guide application.

A typical non-program-guide application might be a shopping application. The shopping application might need to display lists of available products. Step 108 would then involve using a program guide graphics routine that is adept at drawing boxes, tables, and the like for the program guide application to display the list of available products for the shopping application. Because the program guide graphics routine is the same as that used by the program guide application, the user may be presented with a consistent user display interface (i.e., the lists of products in the shopping application program look much the same as the lists of listings in the program guide).

To avoid use of non-program-guide applications with inconsistent user interfaces, step 110 may involve configuring or using program guide application 70 to ensure that non-program-guide applications with such inconsistent user interfaces may not be readily accessed by the user.

The integration of non-program-guide application features into the program guide application to provide the user with a consistent user interface may be accomplished in a number of ways. For example, icons may be provided on certain program guide display screens that allow the user to launch non-program guide applications from deep within the program guide. Non-program guide applications may also be integrated directly into the program guide. Other program guide features that promote consistency of the user interface may include providing hot links to non-program guide applications from within the program guide application. These and other features that promote consistency and create the impression that the user is using one integrated system rather than a collection of disparate applications are described in more detail below.

Figure 6:
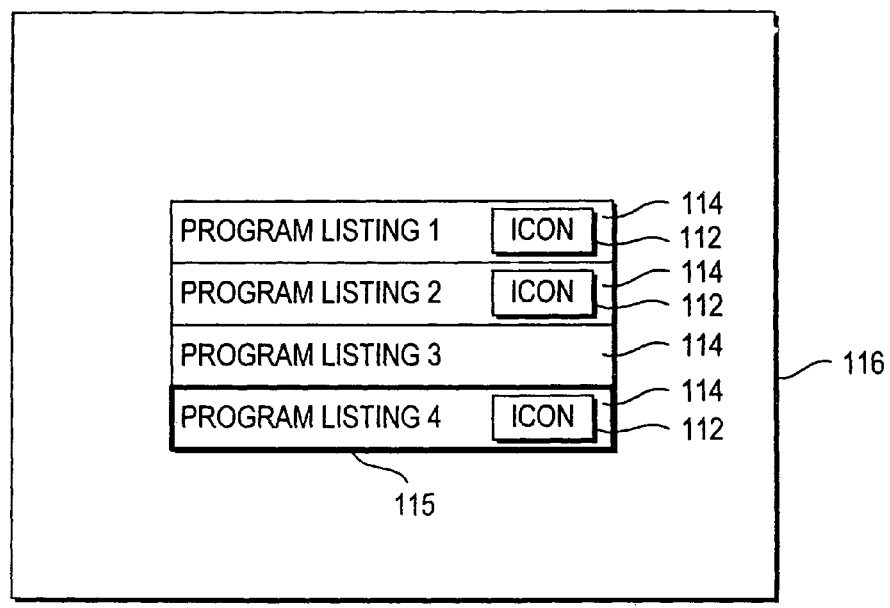
FIG. 6 is an illustrative program guide display screen containing program listings having icons indicating the availability of interactive components associated with the program listings.

Some non-program-guide applications may be used to provide an interactive component associated with programming on an otherwise passive audio or video channel. Interactive non-program-guide applications of this type may be delivered to set-top box 44 along with the audio and video programming being distributed by television distribution facility 36. Program guide application 70 may provide indicators such as icons on certain program guide display screens (whether full screen display screens or partial screen overlay display screens) to indicate that the interactive component is available. For example, icons 112 may be provided adjacent to certain program listings 114 on program guide display screen 116 within program guide application 70, as shown in FIG. 6. Program guide display screen 116 is a program listings screen, but any suitable program guide display screen may be provided with icons 112 or any other suitable indicators of interactive content.

Figure 7:
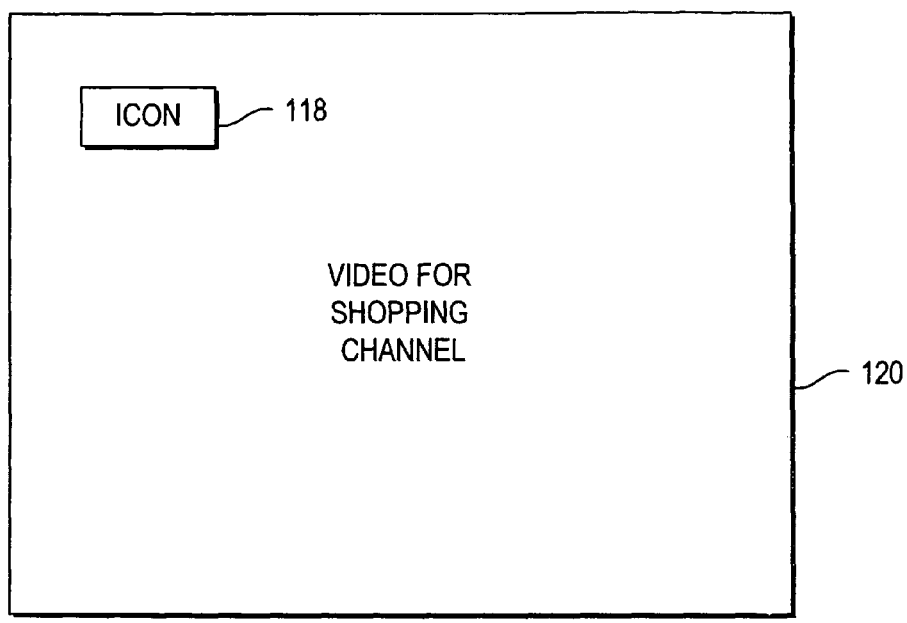
FIG. 7 is an illustrative television screen showing how an icon indicating the availability of an interactive component may be displayed as an overlay on top of the video for a particular television channel in accordance with the present invention.

If desired, an indicator may be displayed as an overlay on a program by itself, as illustrated by icon 118 of FIG. 7, which is displayed as an overlay on top of shopping channel 120 to indicate that the shopping channel has an interactive component available.

Indicators such as those of FIGS. 6 and 7 may alert the user to the type of interactive content that is available. For example, if the interactive content relates to purchasing a product, the indicator may be an icon of money or a cash register. If the interactive content relates to viewing a web site, the indicator may be a icon representative of the Internet. These indicators are merely illustrative. Any suitable indicator or icon may be provided to indicate the presence of interactive content if desired.

Indicators or other information about which programs have interactive components may be distributed to the program guide application as part of the television programs with which the interactive components are associated. For example, information on an interactive component associated with a given program may be provided on a sideband of the channel that carries the program or, in digital system, may be provided as part of a digital stream that includes the program. Alternatively, indicators may be distributed to the program guide application as part of a data stream (e.g., the stream of program guide data provided to set-top box 44 from main facility 34 via television distribution facility 36.) If desired, the indicator may be incorporated into the program guide application prior to loading the application onto set-top box 44.

Figure 8:
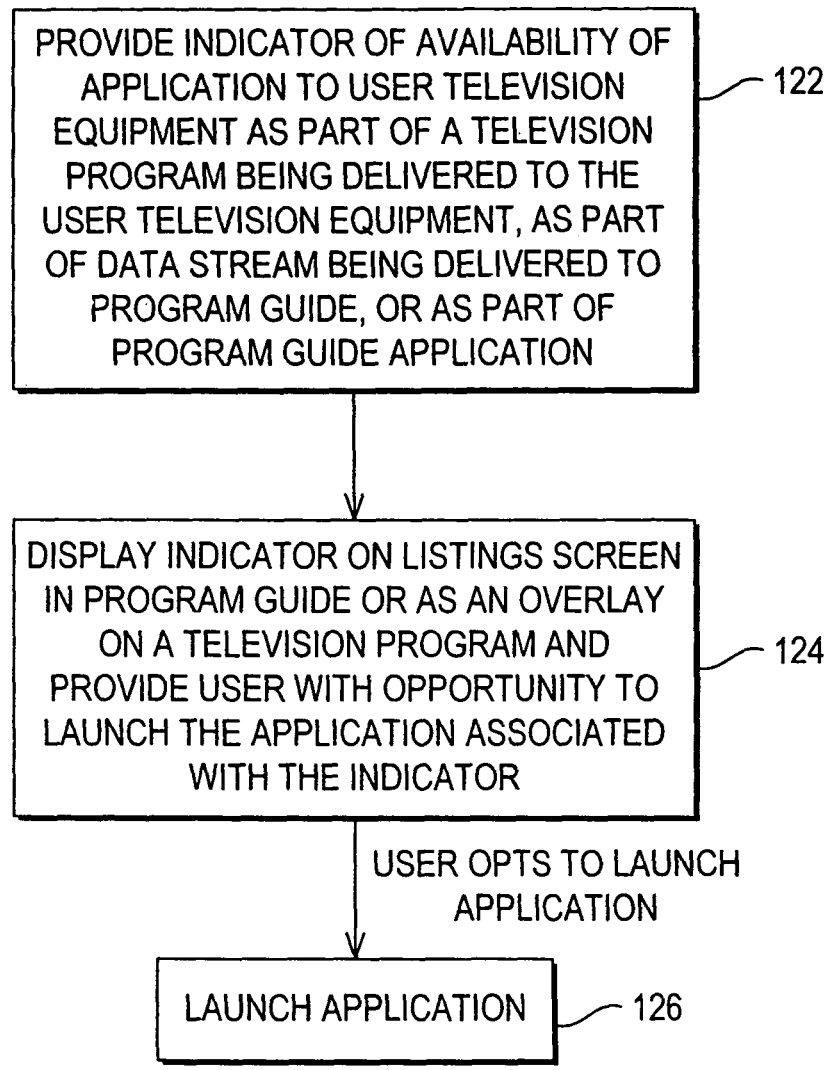
FIG. 8 is a flow chart of illustrative steps involved in indicating to a user that a non-program-guide application is available in accordance with the present invention.

FIG. 8 shows steps involved in using an indicator in the program guide application to indicate to the user that there is interactive content available to the user. The various distribution techniques that may be used to provide the indicator to the program guide are shown at step 122. After the indicator has been provided to the program guide in step 122, the program guide application displays the indicator on a program guide display screen such as a television program listings screen, on another suitable display screen generated by program guide application 70, or directly on top of a television program as an overlay at step 124. The program guide also provides the user with an opportunity to launch the application associated with the indicator at step 124.

Figure 9:
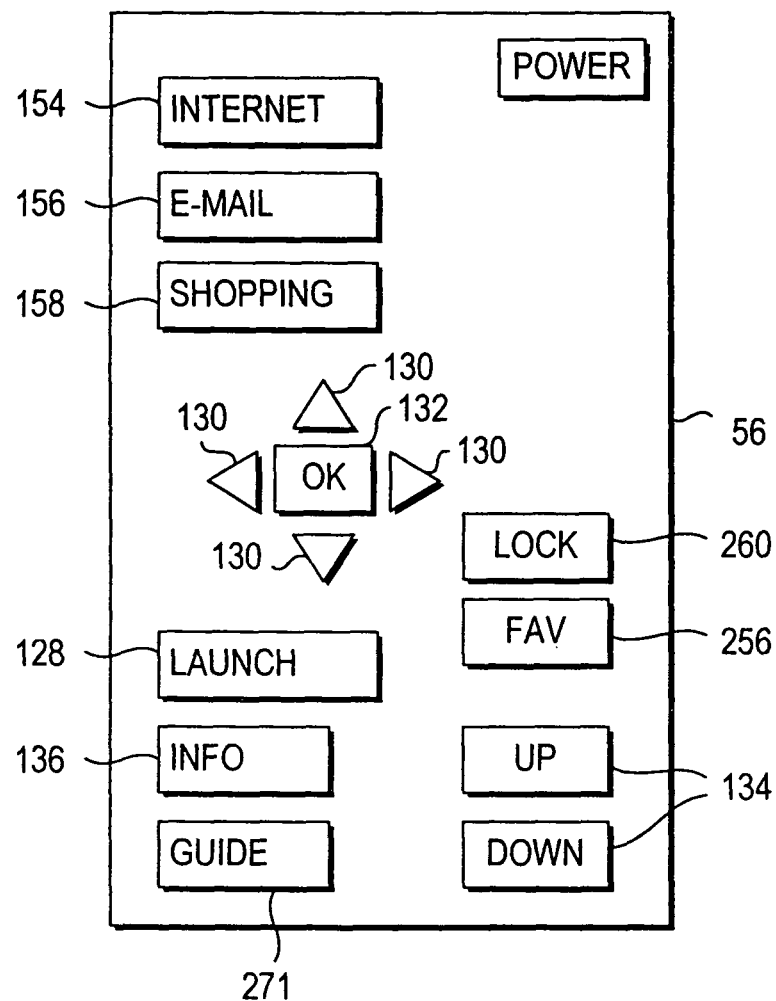
FIG. 9 is a diagram of an illustrative remote control that may be used to control the user television equipment in accordance with the present invention.
Figure 10:
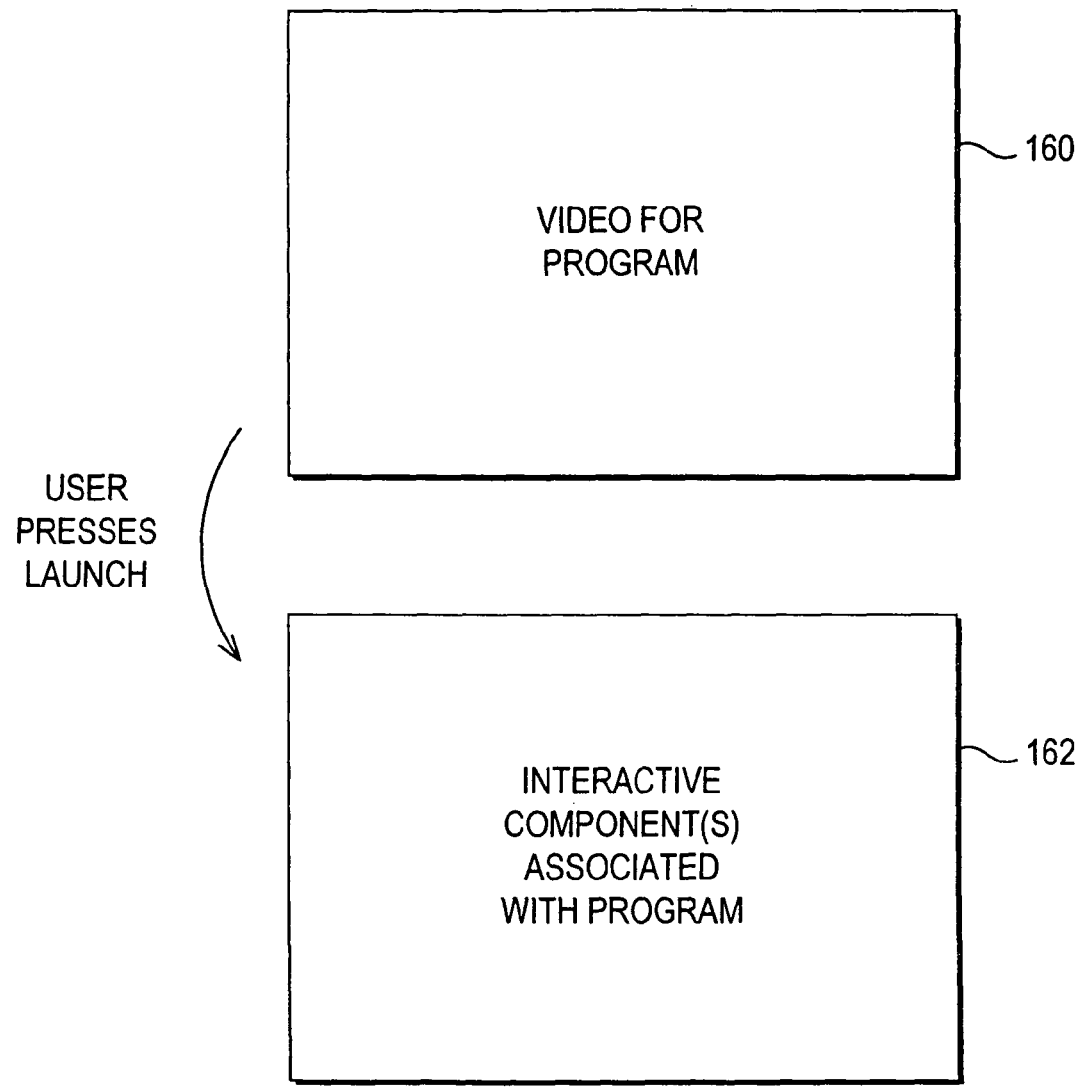
FIG. 10 is a diagram showing how an interactive component associated with a program may be launched by pressing a dedicated button in accordance with the present invention.

The program guide application may allow the user to launch the interactive component by pressing a key on remote control 56 (FIG. 1). For example, remote control 56 may have a dedicated "launch" key 128 as shown in FIG. 9 that causes the program guide application to launch any interactive component associated with the current program when pressed by the user. If there is an indicator (e.g., an icon) associated with a given program or listing when the user presses launch, the program guide invokes the interactive component associated with that indicator. If there is an interactive component associated with a given program or listing, but no icon or other indicator present, the program guide may still invoke the interactive component associated with the given program or listing. For example, as shown in FIG. 10, when the user is viewing video for a program 160, the user may press launch key 128 to direct the program guide to display the interactive component or components that are associated with the video for the program (shown as interactive component(s) 162).

Figure 11:
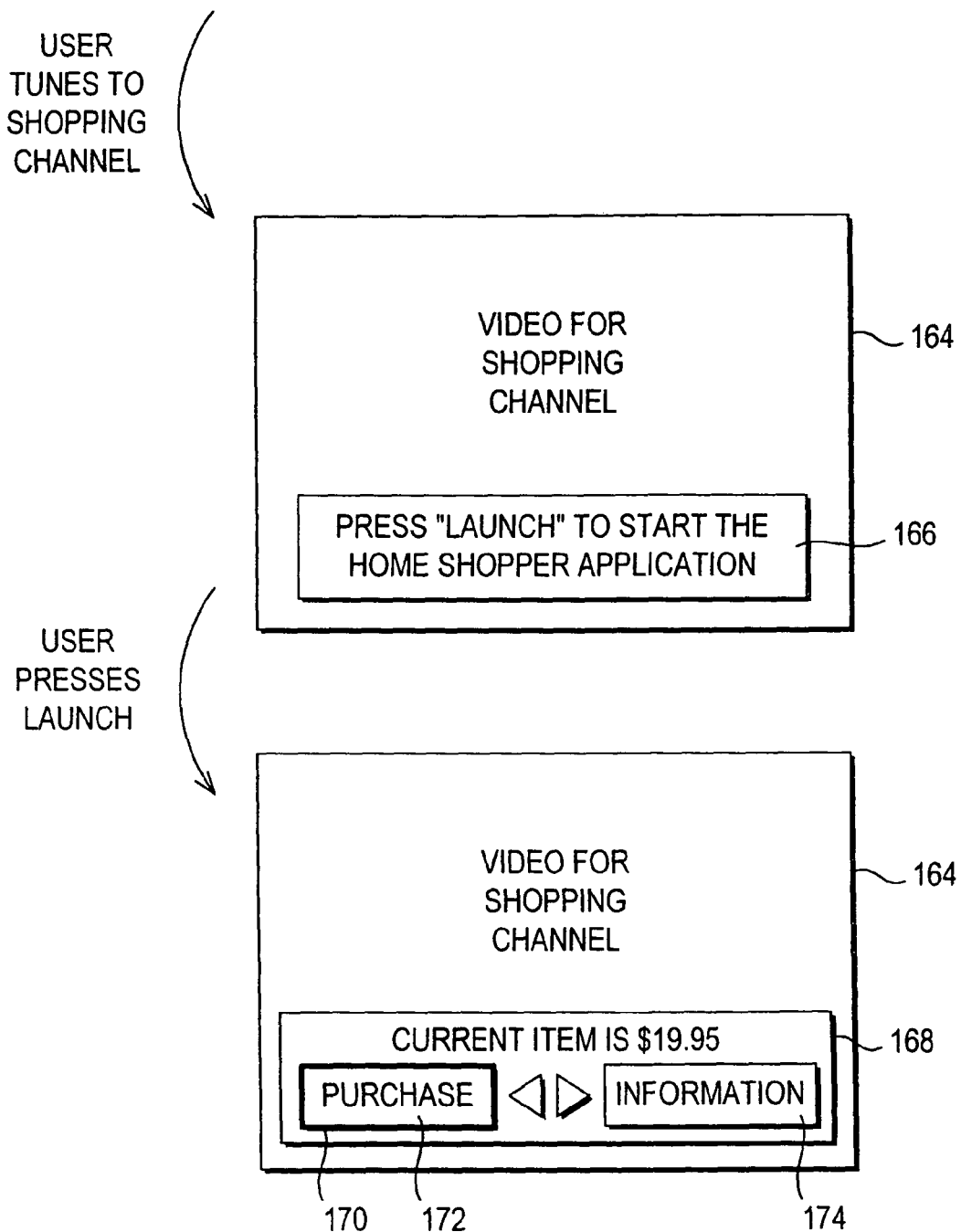
FIG. 11 is a diagram showing how a user may invoke a non-program-guide application by responding to an on-screen prompt in accordance with the present invention.

Alternatively, when the user tunes to a given program, the program guide may present an on-screen option to launch the interactive component (along with any available information about that component). This is shown in FIG. 11. In the example of FIG. 11, the user tunes to the shopping channel 164, which causes the program guide to display text box 166 instructing the user to press launch to invoke the home shopping application. If the user presses launch, the program guide launches the home shopping application. As shown on the lower display screen in FIG. 11, the home shopping application may display a home shopping overlay 168 on top of the current channel 164. Overlay 168 may contain a description of a product that is being promoted on shopping channel 164 and a highlight 170 that may be positioned by the user to select from various options. The illustrative options shown in overlay 168 include purchase option 172, which allows the user to initiate a sequence of purchase screens, and information option 174, which allows the user to request additional information (either electronic or printed) for merchandise such as the product currently being promoted on shopping channel 164.

Figure 12A:
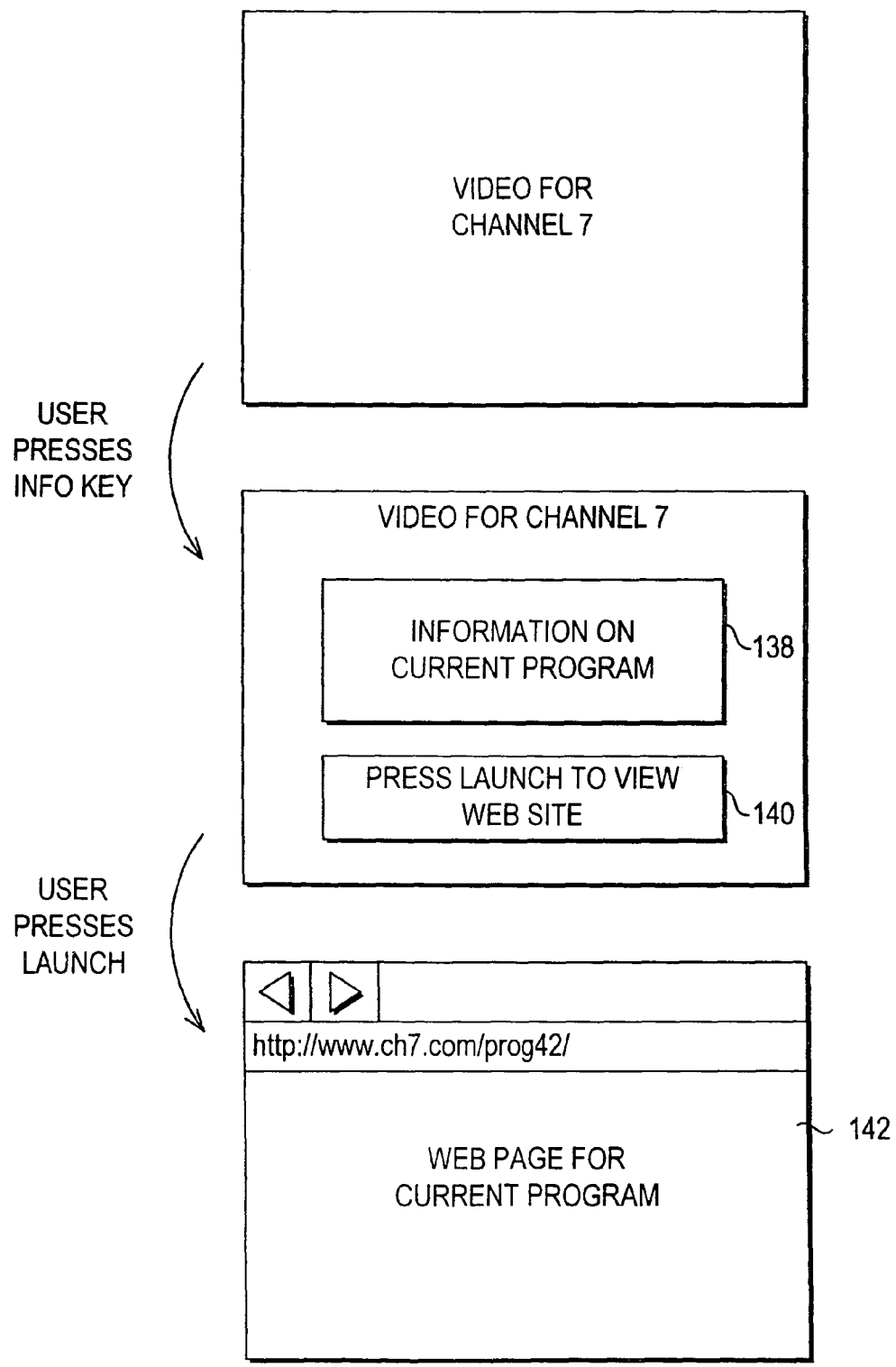
FIG. 12a is a diagram illustrating how the user may obtain additional information on a given program by pressing an information key while tuned to the given program and how the user may launch a non-program-guide application (e.g., a web browser) by pressing a launch button once the information has been displayed in accordance with the present invention.
Figure 12B:
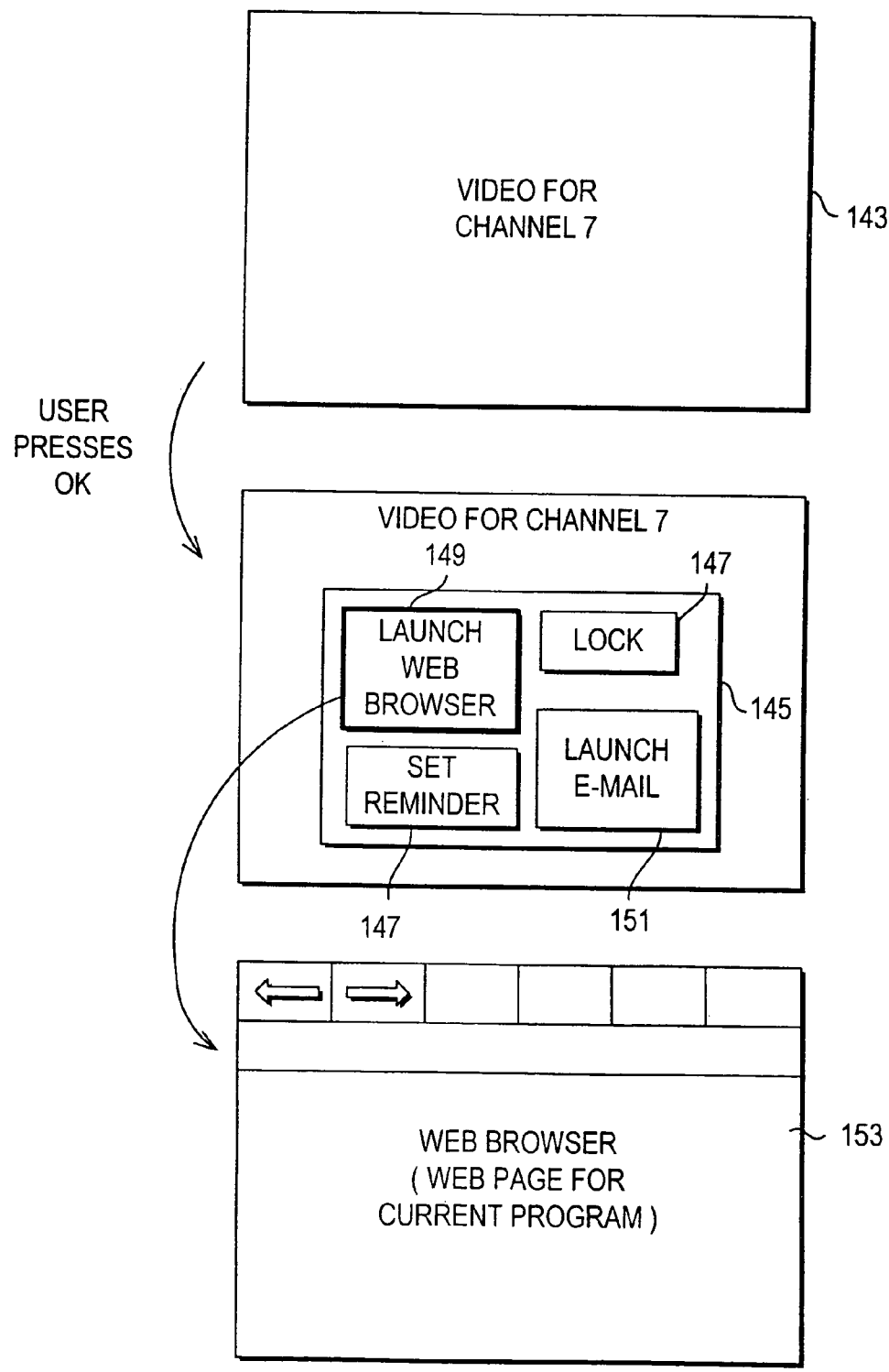
FIG. 12b is a diagram illustrating how the user may activate and use an overlay containing various program guide options and options for launching non-program guide applications in accordance with the present invention.

If desired, information indicating that an interactive component is available may be presented to the user after the user requests information on a program or listing. For example, as shown in FIG. 12a, if the user is watching a television program on channel 7, the user may press a remote control info key to obtain more information. When the program guide senses that the info key has been pressed, the program guide may display information for the current program in, for example, an overlay such as information window 138. The program guide also provides an on-screen option to launch an interactive component that is associated with the current program such as on-screen option 140. In the example of FIG. 12a, the interactive content associated with the current channel is provided by a web browser application. When the user presses launch, the program guide launches the web browser application and directs the web browser to retrieve a web page 142. The web page may be associated with the current program (i.e., the program that was being displayed on channel 7 when the user pressed the info key.) The user may also launch an interactive component using a overlay window or other on-screen option region as shown in FIG. 12b. Initially, the user may be watching a particular television program on television display 143. The user may press an OK key on a remote control or other suitable remote control button or may use any other suitable technique to activate an option region 145. Option region 145 may contain options 147 for performing program guide functions such as setting reminders and setting parental controls. Option region 145 may also contain options such as options 149 and 151 for launching interactive components. If the user highlights and selects an option, the associated interactive component may be launched and directed to perform a function associated with the current television program. For example, if the user selects launch web browser option 149, the web browser may be launched and directed to retrieve a web page 153 associated with the current program.

If desired, the user may launch an e-mail application in this way by selecting launch e-mail option 151. The e-mail application can be launched with a preloaded address that is associated with the current program. Further features of an illustrative e-mail messaging system are described in McKissick et al. U.S. patent application Ser. No. 09/356,245, filed concurrently herewith, which is hereby incorporated by reference herein in its entirety.

A user may launch an application from an information screen associated with a program or channel or the like. Systems that allow a user to launch applications from information screens are described in Rudnick et al. U.S. patent application Ser. No. 09/356,268, filed concurrently herewith, which is hereby incorporated by reference herein in its entirety.

An indicator or icon or a message such as "if you have interactive television you may press your launch button" may be displayed by the program guide when desired to inform the user that interactive components are available. When there is a single indicator such as an icon overlaid on top of a given program, the program guide launches the non-program-guide application associated with that icon when the user presses launch. When there are several icons displayed on a given screen such as in the arrangement of FIG. 6, the user may first select a given program listing (e.g., using a highlight region such as highlight region 115 in FIG. 6 or other suitable arrangement). If a highlight region is used, arrow keys 130 (FIG. 9) may be used to move the highlight region to the desired program listing before the user presses the launch key. An "OK" key 132 (FIG. 9) may be used to perform typical program guide functions such as selecting a listing when it is desired to tune to the program for that listing. The remote control may also include up and down keys 134 and Info key 136. Pressing launch button 128 (FIG. 9) after a program listing has been highlighted or otherwise selected causes the program guide to launch the non-program-application that is associated with the icon or other indicator for the listing. The step of launching the non-program-guide application is shown as step 126 in FIG. 8.

Figure 13:
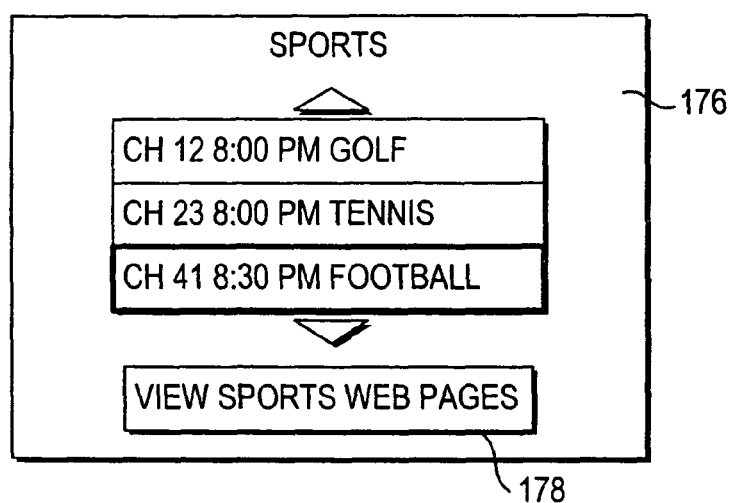
FIG. 13 is an illustrative program guide display screen containing program guide listings for a particular category (sports) and containing an on-screen hot link to a web browser application in accordance with the present invention.

Non-program-guide applications and other interactive content may be incorporated directly into the program listings provided by the program guide application. As shown in FIG. 13, for example, when the program guide is displaying sports program listings on a display screen such as sports listings display screen 176, the program guide may display an option such as option 178 on display screen 176 that allows the user to launch a web browser application to view various sports-related web pages. In the FIG. 13 example, both the program listings and the option to invoke the non-program-guide application are related to a specific type of content (sports).

Figure 14:
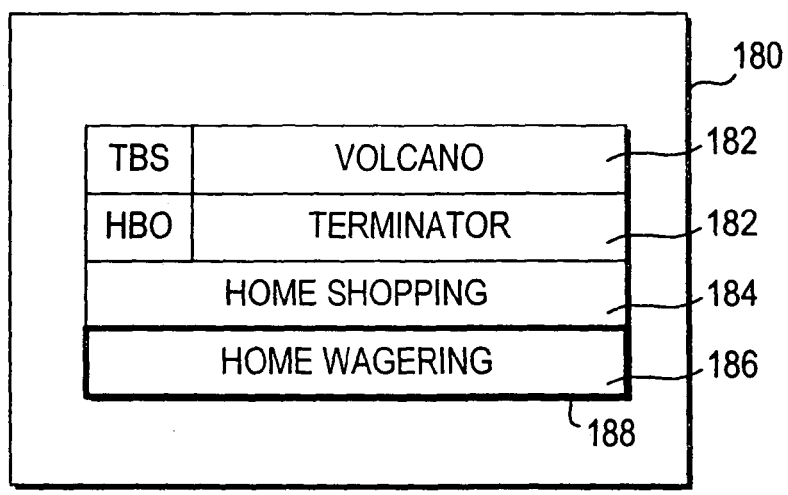
FIG. 14 is an illustrative program guide display screen containing program guide listings and menu options for launching various non-program-guide applications in accordance with the present invention.

Another example is shown in FIG. 14. In this example the program guide displays a program guide display screen 180 containing various movie program listings 182. Options 184 and 186 to launch non-program-guide applications are embedded directly in movie program listings 182. The user may select one of options 184 and 186 to launch an application or may select one of program listings 182 to tune to the channel associated with that listing by positioning highlight region 188 or another suitable indicator on top of the desired entry using arrow keys 130 and by pressing OK key 132. Integrating options to launch non-program-guide applications directly into the program listings provided by the program guide application helps create a seamless user interface and encourages users to use the non-program-guide applications.

Figure 15:
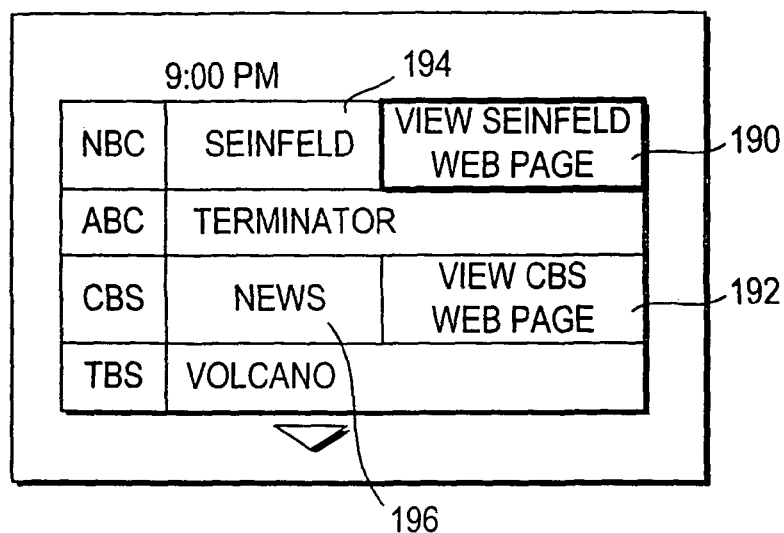
FIG. 15 is an illustrative program guide display screen containing a grid of program listings in which certain grid cells provide selectable hot links that allow the user to invoke a web browser application and to direct the web browser application to retrieve certain web pages related to the show to which the selectable options are adjacent in the grid in accordance with the present invention.

Another approach for integrating options to launch non-program-guide applications with program listings is shown in FIG. 15. In the FIG. 15 example, the program guide displays options 190 and 192 for invoking a non-program guide application (i.e., a web browser application) immediately adjacent to the titles 194 and 196, respectively, of related program listings.

Figure 16:
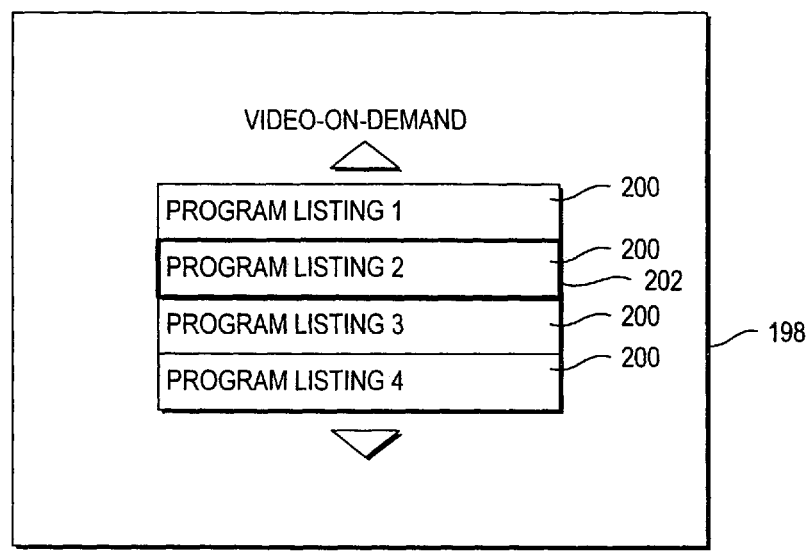
FIG. 16 is an illustrative program guide display screen containing video-on-demand program listings in accordance with the present invention.

Many video-on-demand functions may be provided by a video-on-demand application that is substantially separate from the program guide such as video-on-demand application 76 in FIG. 2. In order for the user to have ready access to video-on-demand programming from within the program guide it is necessary to provide access to video-on-demand programs from within program guide program listings screens and other program guide display screens provided by the program guide. An illustrative program guide display screen 198 that contains video-on-demand program listings 200 is shown in FIG. 16. The user may select a given one of the displayed program listings 200 using a suitable indicator such as highlight region 202. Selecting a given video-on-demand program listing causes the program guide to launch video-on-demand application 76 (FIG. 2) and to direct video-on-demand application 76 to retrieve and play the video-on-demand program associated with the selected program listing for the user. The videos being played for the user may be distributed to user television equipment 40 from server 58 using any suitable technique.

Figure 17A:
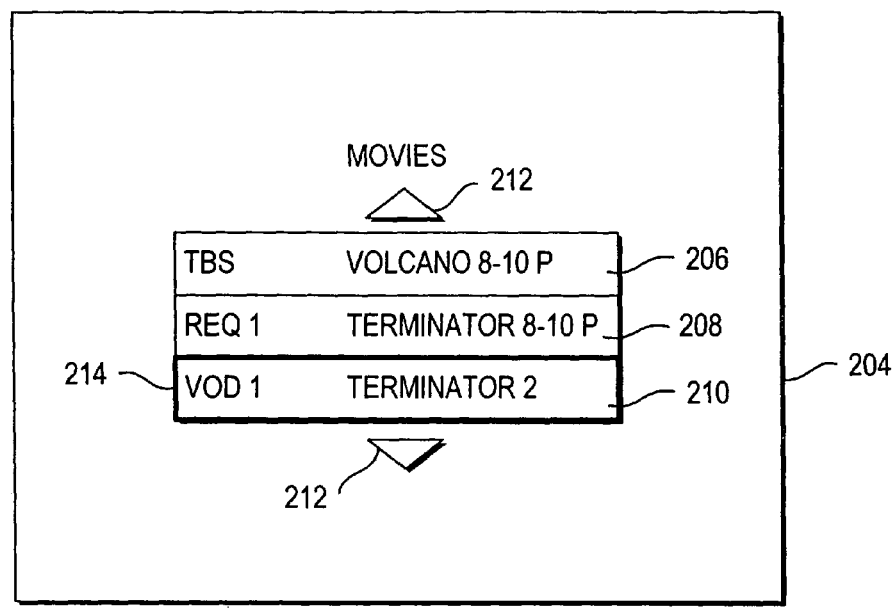
FIG. 17*a* is an illustrative program guide display screen containing video-on-demand program listings intermixed with normal program listings in accordance with the present intention.

The program listings data needed by the program guide to display video-on-demand program listings may be provided to the program guide application from program guide database 32 (FIG. 1) or from video-on-demand application 76 (implemented using video server 58). In the example of FIG. 16, program guide display screen 198 is dedicated to video-on-demand listings. If desired, video-on-demand program listings may be integrated into program guide display screens that contain both video-on-demand program listings and program listings other than video-on-demand program listings, as shown in FIG. 17a. Program guide display screen 204 contains program listings for program listings 206 and 208 that are on non-video-on-demand channels. Program guide display screen 204 also contains program listing 210 for a video-on-demand program. The user may scroll up and down through the program listings of screen 204 as indicated by arrows 212. The user may select a given program listing using an indicator such as highlight region 214. When the user presses OK key 132 (FIG. 9), the program guide launches video-on-demand application 76 (FIG. 2) and directs video-on-demand application 76 to provide the movie (Terminator 2 in the example of FIG. 17a) for the selected video-on-demand listing.

Another suitable format in which video-on-demand listings may be incorporated into a program guide display screen displayed by the interactive television program guide application involves a two-dimensional list or grid (hereinafter collectively referred to as a grid) of program listings, as shown in FIG. 17b. In the example of FIG. 17b, programs 3 and 4 are video-on-demand programs and may be ordered, for example, by positioning a highlight region on top of the desired selection and pressing a remote control "OK" button.

Figure 18:
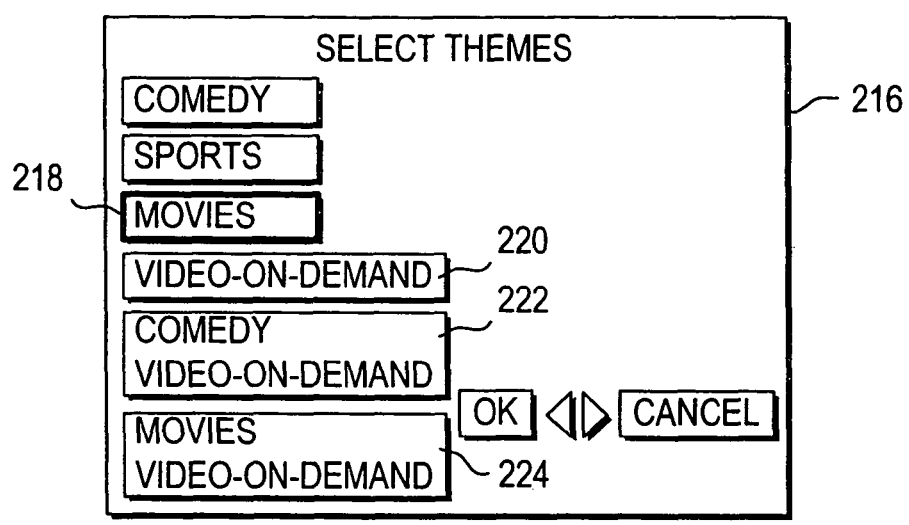
FIG. 18 is an illustrative program guide display screen that contains options with which the user may choose to view program listings for particular categories or themes. Some of the illustrative programming themes in the FIG. 18 display screen relate to video-on-demand programming in accordance with the present invention.

Program guide display screen 204 of FIG. 17a contains program listings in the "movies" category. Category-specific display screens such as screen 204 may be requested from a program guide menu such as select themes menu 216 of FIG. 18. The user may select a desired theme using highlight region 218. As shown in FIG. 8, some of the themes may include video-on-demand content. For example, selecting video-on-demand option 220 directs the program guide to display a program guide display screen such as display screen 198 of FIG. 16. Selecting comedy video-on-demand option 222 from menu 216 directs program guide application 70 to display a similar display screen, but only containing videoon-demand program listings related to comedy. Similarly, selecting movies video-on-demand option 224 directs the program guide to display video-on-demand program listings related to movies. If desired, theme-specific video-on-demand options may be incorporated in other program guide display screens such as display screens used for selecting various program category sort options. Video-on-demand program listings may be incorporated on any suitable program guide display screen, including program listings grids, time and channel based listings screens, and flip and browse displays. Various arrangements for incorporating video-on-demand program listings into such displays are described in Ellis U.S. patent application Ser. No. 09/262,870, filed Mar. 4, 1999, which is hereby incorporated by reference herein in its entirety.

Figure 19A:
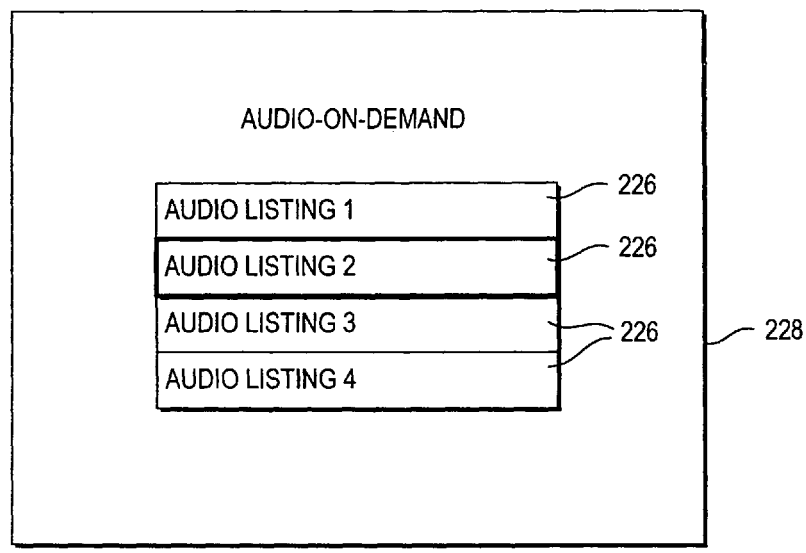
FIG. 19*a* is an illustrative program guide display screen containing selectable audio-on-demand program listings in accordance with the present invention. If the user selects one of the listings, the interactive television program guide application launches an audio-on-demand application and directs it to play the audio associated with the selected listing in accordance with the present invention.
Figure 19B:
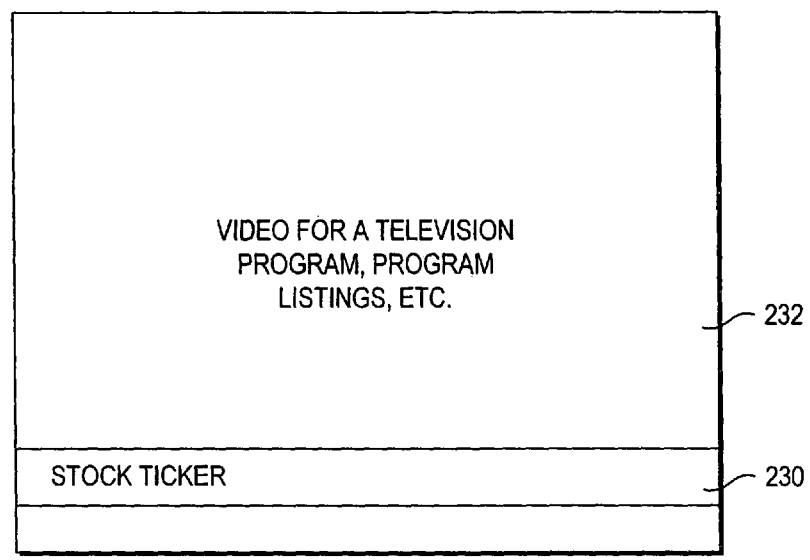
FIG. 19*b* is a diagram illustrating the display of a data service such as a stock ticker that may be provided on top of the video for a television program or program listings or the like in accordance with the present invention.

Other interactive content may be handled similarly to video-on-demand content. As shown in FIG. 19a, audio-on-demand listings 226 (e.g., karaoke listings) may be displayed on program guide display screen 228 by program guide application 70. Selecting a given audio-on-demand program listing directs program guide application 70 to launch audio-on-demand application 74 (FIG. 2) and directs the audio-on-demand application to play the audio track for the selected listing. As shown in FIG. 19b, data services may be treated similarly. In the example of FIG. 19b, stock ticker 230 may be displayed by the program guide as an overlay on top of screen 232, which may contain video for a television program, program listings, or other suitable program guide display screen content.

Figure 20:
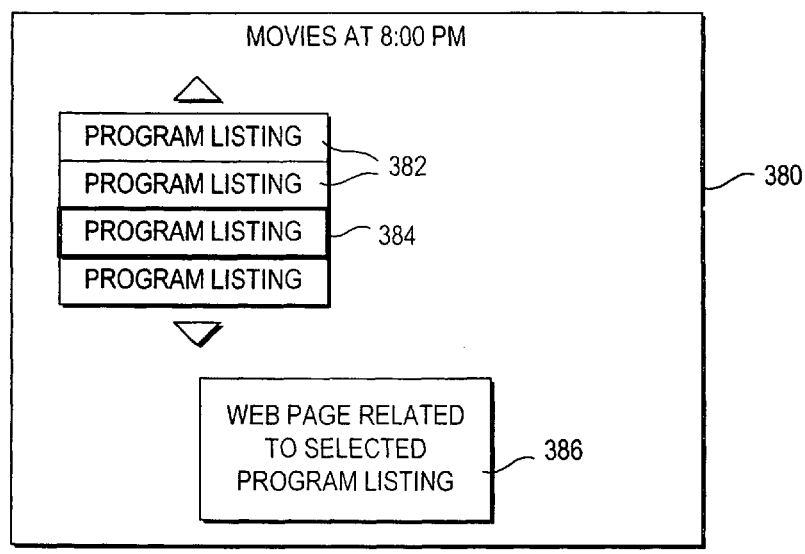
FIG. 20 is a diagram illustrating how web content or the like may be embedded into a program guide display screen in accordance with the present invention.

Content from a non-program-guide application may be embedded into a display screen generated by another non-program-guide application or may be embedded into a program guide display screen. For example, web content may be embedded into a program guide display screen provided by the program guide, as shown in FIG. 20. In the example of FIG. 20, the program guide has displayed program guide display screen 380. Program guide display screen 380 contains program listings 382. The user may position highlight region 384 using remote control arrow keys. When the user has highlighted a desired program listing, the user may press an OK key on the remote control, which causes web content supplied by an Internet application (e.g., a web browser) to be displayed in window 386.

The arrangement of FIG. 20 is illustrative. If desired, other program guide display screens may be provided with embedded content from non-program-guide applications. For example, such content may be embedded in a menu screen, settings screen, parental control screen, set reminders screen, pay-per-view ordering screen, program listings screens such as by time, by channel, and by genre listings screens, etc. Moreover, content from one non-program-guide application (such as an Internet browser application) may be embedded into the display screen of another non-program-guide application (such as the display screen of a home shopping application).

The program guide may also incorporate listings with related web content in the program guide display screens. Selecting such a program listing from a display screen may direct program guide application 70 to launch Internet web browser application 84 (FIG. 2) and may direct Web browser application 84 to retrieve the related web content. Content related to other applications such as shopping application 80 (FIG. 2), gaming services application 90, etc. may be handled in a similar manner.

Figure 21A:
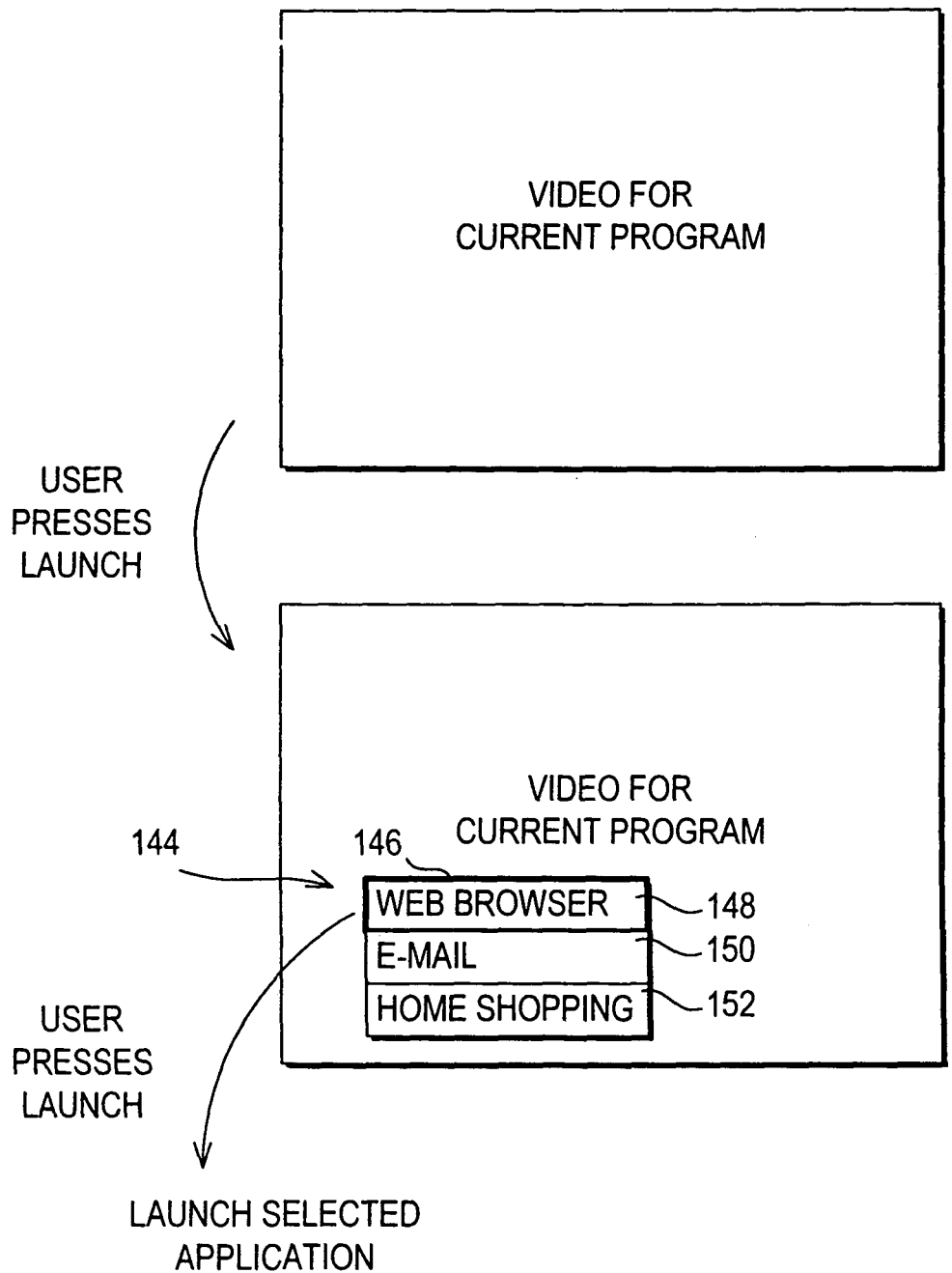
FIG. 21*a* is a diagram showing how the program guide application may display a list of selectable options for available non-program guide applications when the user presses launch in accordance with the present invention.

As shown in FIG. 21a, if there are several interactive components associated with a given program, the program guide may display these in the form of pop-up menus or other suitable displays when the user presses launch. In the example of FIG. 21a, when the user presses launch, the program guide displays pop-up menu 144. Pop-up menu 144 contains a highlight region 146 that may be positioned on any of the entries in pop-up menu 144 by the user (by using remote control 56). The program guide will launch the corresponding application once the user makes a selection from pop-up menu 144.

When non-program guide applications are launched, using pop-up menu 144 or any other suitable launching arrangement, it may be desired for the program guide to direct the invoked non-program-guide application to take an action related to certain content in the program guide or related to the state of set-top box 44. For example, it may be desired to direct an invoked non-program-guide application to take some action based on which television program is currently being displayed by set-top box 44 or based on which program listing or menu item is highlighted within the program guide. This type of interconnection between the program guide and the non-program-guide application may be accomplished using hot links.

Hot linking involves invoking a non-program-guide application with information for use by the application such as a web site address, e-mail address, program title, or other information that has been preselected based on the current content of the program guide or status of set-top box 44. For example, a user may be watching a program, viewing a program listing, viewing the description of a program, etc. or taking other action within the program guide related to a given program, program listing, program description, type of program (e.g., comedy, sports, etc.), channel, channel listing, channel description, type of channel (e.g., sports, comedy, weather, pay-per-view, premium, etc.), programming package, package listing, package description, package type (time block package, premium services package, comedy, movies, etc.) or the like. If the user activates the hot link, an associated non-program-guide application may be launched and directed to take an action related to the content of the program guide (i.e., an action related to the program, listing, description, etc. that the user is viewing). Examples of the different states of the set-top box that may influence what type of action is taken during hot linking include whether the modem is or is not in use, whether the keyboard is enabled or not, whether memory is available or not, etc. If the non-program guide application requires the use of the modem, the non-program-guide application may not be launched unless the modem is not in use. If the non-program-guide application requires the use of a keyboard (e.g., for e-mail or chat), the non-program-guide application may not be launched unless the keyboard has been enabled. If the non-program-guide application requires certain memory resources, that application may only be launched if there is sufficient memory available.

Hot links may be activated by dedicated buttons, the launch button, menu options, or any other suitable technique. For example, remote control 56 may be provided with a dedicated web browser button such as Internet button 154, a dedicated e-mail button 156, a dedicated shopping button 158 and similar buttons associated with other non-program-guide applications, as shown in FIG. 9. When the user presses Internet button 154 while watching a given television program, the program guide launches the web browser and may direct the web browser to retrieve a web page related to the program or current channel. When the user presses e-mail button 156, the program guide launches the e-mail program and directs the e-mail program to set up an e-mail message to a character in the program, a fan club, or other message recipient associated with the program or channel. When the user presses shopping channel button 158, the program guide launches a shopping application and directs the program guide to preselect merchandise related to the program or channel.

The example of FIG. 21a illustrates the use of hot links. If the viewer selects web browser option 148, the program guide may launch a web browser application and may direct the web browser to locate a web page related to the current program being displayed. The address of the web page may be incorporated into a database maintained by the program guide on set-top box 44, may be transmitted to the program guide-with the program itself, or may be provided to the program guide by any other suitable technique. If the user selects option 150, the program guide may launch e-mail application 150 and may direct the e-mail application to initiate a message to, for example, a particular cast member of the current program or to the fan club for the current program. If the user selects option 152, the program guide may launch a home shopping application and may direct the home shopping application to preselect or present merchandise that is related to the current program or channel.

Figure 21B:
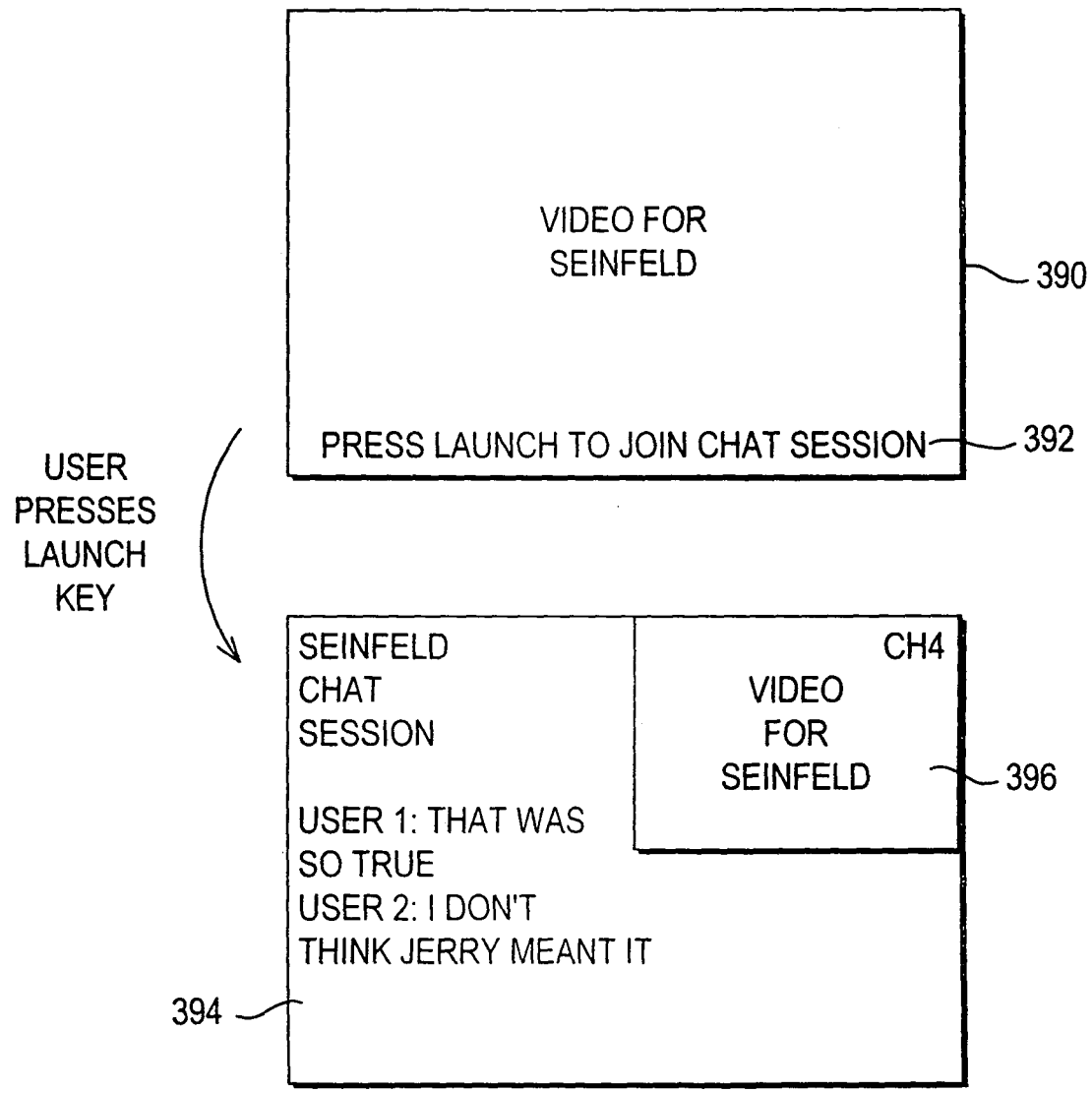
FIG. 21*b* is an illustrative diagram showing how a user who is viewing a television program may activate a hot link (by pressing a launch key) that launches a chat application and directs the chat application to initiate a chat session related to the television program in accordance with the present invention.

Another example is shown in FIG. 21b. As shown in the upper portion of FIG. 21b, the user may initially be watching television program 390. A message 392 may be displayed indicating the availability of a hot link to a chat session related to the current television program. When the user presses launch or otherwise invokes a chat application, the chat application may display a chat session related to the current television program in display region 394. The video for the current television program may be displayed in window 396. A chat application may be linked to a program, a program listing for a program, a description of a program, a type of program, a channel, a channel listing, a description of a channel, a type of channel, etc.

Figure 22:
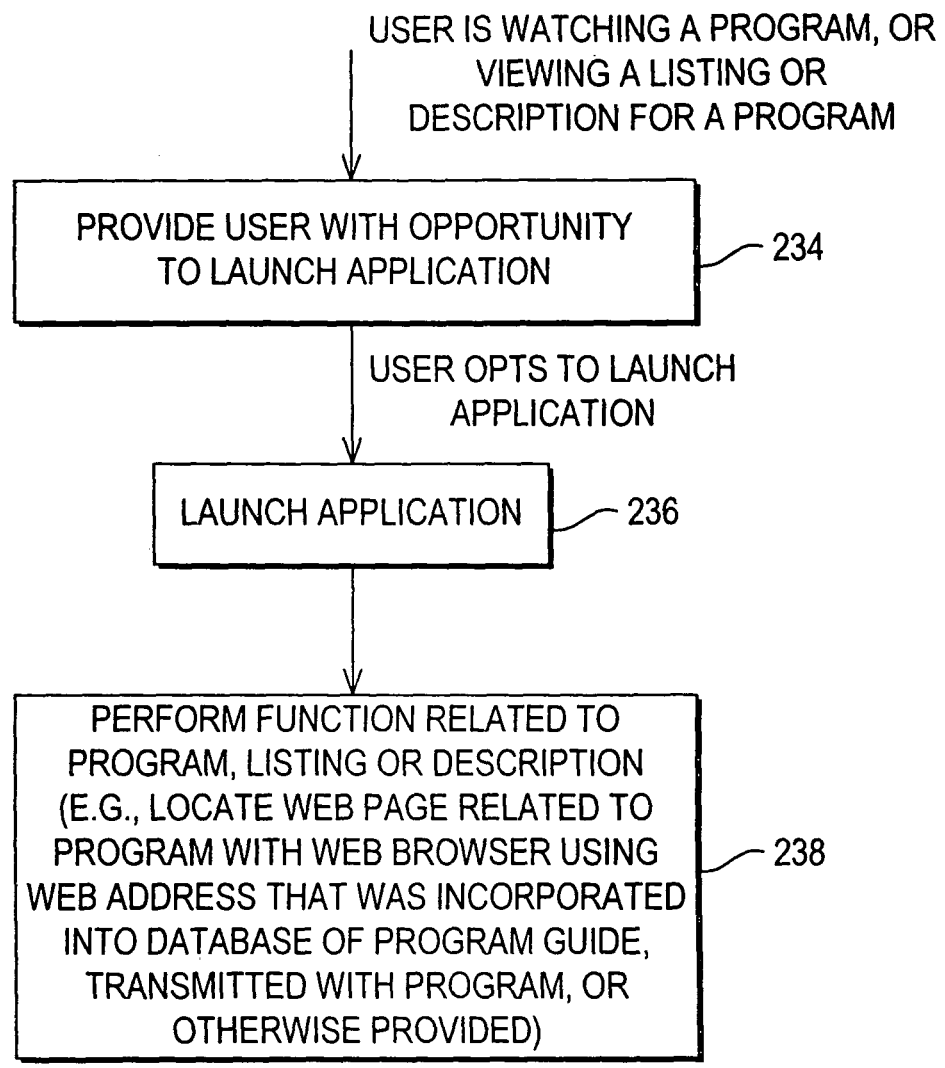
FIG. 22 is a flow chart of illustrative steps involved in using a hot link for a non-program-guide application in accordance with the present invention.
Figure 23:
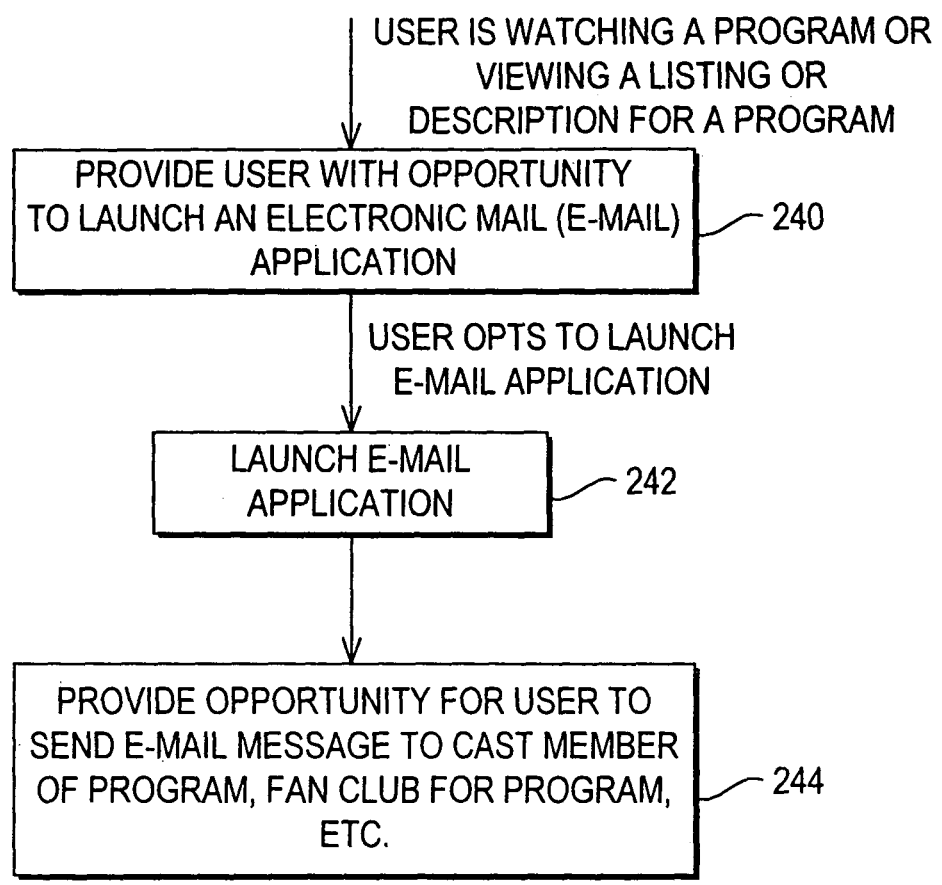
FIG. 23 is a flow chart of illustrative steps involved in using an electronic mail (e-mail) hot link in accordance with the present invention.
Figure 24:
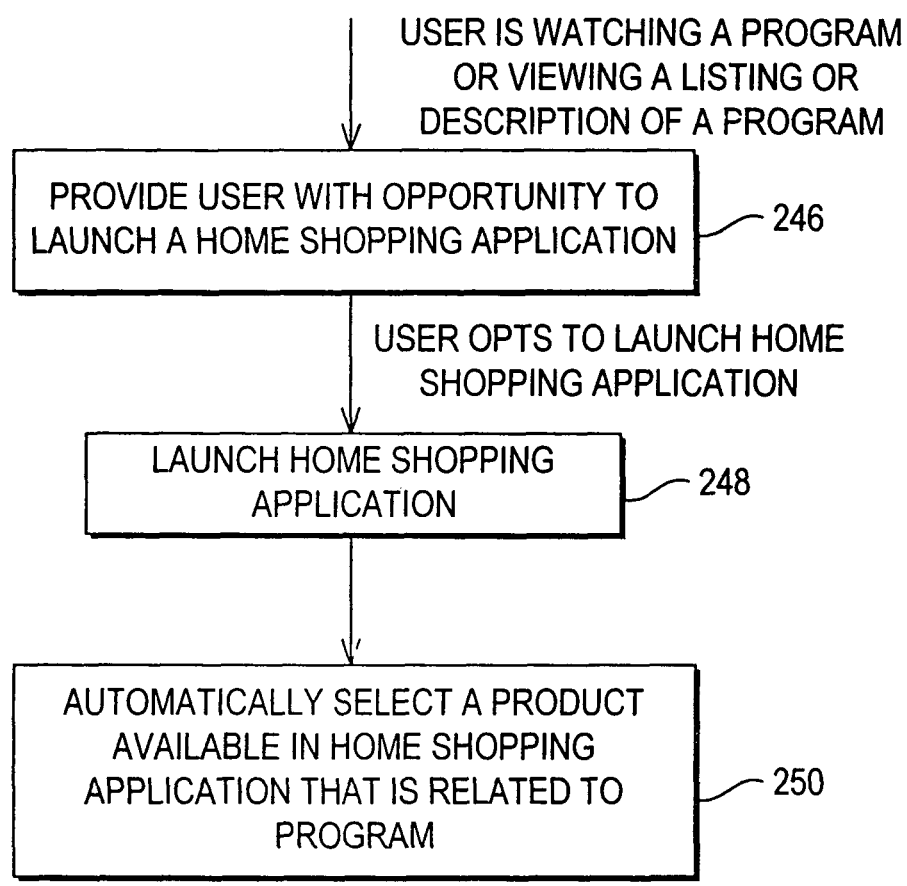
FIG. 24 is a flow chart of steps involved in using a home shopping hot link in accordance with the present invention.

Steps involved in using illustrative hot link arrangements are shown in FIGS. 22-24. FIG. 22 illustrates how a hot link to an application (e.g., a web browser, chat application, etc.) may be provided. Initially, the user is watching a television program or viewing a listing or a description for a program or channel. The program guide may then provide the user with an opportunity to launch the application (e.g., the web browser, chat application, etc.) at step 234. If the user opts to launch the application, the program guide may launch the application at step 236 while directing the program guide to perform a function related to the current program, program listing for a given program, program description for a given program, type of program, channel, channel listing, channel description, or type of channel, etc. For example, if the application is a web browser, the web browser may be directed to retrieve a web page related to the program that the user was watching or the program for which the user was viewing a listing or description. The program guide application may direct the web browser to retrieve a particular web page by providing the web browser with a web address that was incorporated into the database of the program guide application, was transmitted with the program, or was otherwise provided. If the application is a chat application, the program guide application may direct the chat application to initiate a chat session on the current program or channel, a chat session related to the selected program listing or channel listing, or a chat session related to the selected description. At step 238, the application performs a function related to the program, channel, program listing, channel listings, program description, or channel description, etc. For example, if the application is a browser, the browser may retrieve web pages related to the program. If the application is a chat application, the chat application may initiate a chat session on the current program.

FIG. 23 illustrates how a hot link to an e-mail messaging feature may be provided. Initially, the user is watching a television program or viewing a listing or a description for a program. The program guide may then provide the user with an opportunity to launch an e-mail application at step 240. If the user opts to launch the e-mail application, the program guide may launch the e-mail application at step 242. At step 244, the user may be provided with an opportunity to send an e-mail message to a cast member, fan club, or other recipient related to the program that the user was watching or for which the user was viewing a listing or description. Further features of an illustrative television e-mail messaging system are described in the above-mentioned McKissick et al. U.S. patent application Ser. No. 09/356,245, filed concurrently herewith. A user may similarly be provided with an opportunity to join a chat group related to the current program. Further features of an illustrative television chat system are described in DeWeese et al. U.S. patent application Ser. No. 09/356,270, filed concurrently herewith, which is hereby incorporated by reference herein in its entirety.

FIG. 24 illustrates how a hot link to a home shopping feature may be provided. Initially, the user is watching a television program or viewing a listing or a description for a program. The program guide may then provide the user with an opportunity to launch a home shopping application at step 246. If the user opts to launch the home shopping application, the program guide may launch the home shopping application at step 248. At step 250, the program guide may automatically select a product or products available with the home shopping application that are related to the program that the user was watching or for which the user was viewing a listing or description. For example, the program guide may display graphic images of the available products on the user's display screen. In this way, the program guide may present products related to the program that the user was watching.

Figure 25A:
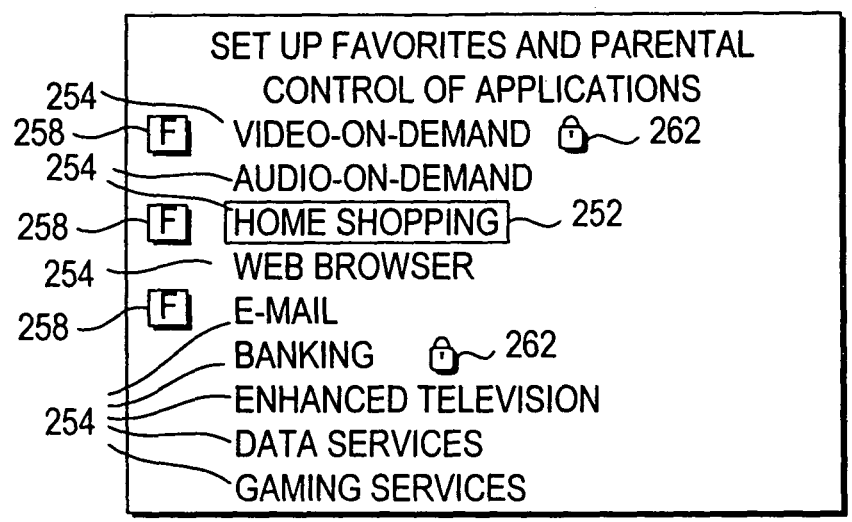
FIG. 25*a* is an illustrative program guide display screen that provides the user with opportunities to set certain non-program-guide applications as favorites or to set parental controls for certain applications in accordance with the present invention.
Figure 25B:
FIG. 25*b* is an illustrative view favorites program guide display screen in accordance with the present invention.

As shown in FIG. 25a, the program guide application may provide the user with opportunities to set certain applications as favorites. For example, the user may position highlight region 252 or other suitable indicator on top of one of applications 254 and press "fav" key 256 (FIG. 9) or otherwise indicate selection of the highlighted entry. The program guide may mark those applications that have been selected as favorites with indicators such as favorites indicators 258. In the example of FIG. 25a, video-on-demand, home shopping, and e-mail have been set as favorites. Setting certain applications as favorites enhances the ability of the program guide to provide access to these applications. For example, the user may direct the program guide to display a list of the user's favorite applications. Only those applications that have been set as favorites are displayed as shown in FIG. 25b. In addition, when the user turns a "favorites model on and is viewing a list of applications, the program guide may control the display of a highlight region or other indicator so that only favorite applications may be highlighted or otherwise brought to the attention of the user. Any favorites display mode suitable for displaying program listings information may generally be used by the program guide to display favorite applications. A favorite application may be deselected as a favorite by highlighting the application and pressing favorite key 256 or using any other suitable deselection technique.

Figure 25C:
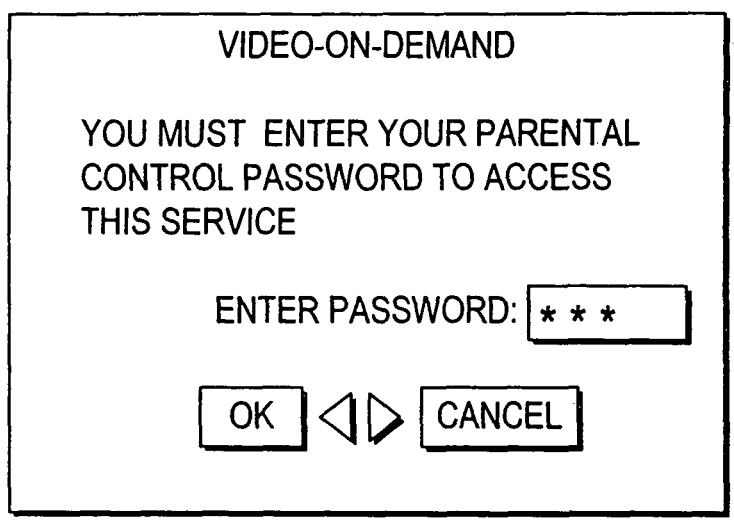
FIG. 25*c* is an illustrative video-on-demand purchase authorization screen in accordance with the present invention.

The program guide may lock certain applications using a parental control feature. The user must then provide a previously-selected parental control password (or use an equivalent parental control authorization technique) to unlock any locked applications before the locked applications may be invoked by the program guide or by the user. When an attempt is made to invoke a locked application, the user is provided with an opportunity to enter the password. If the correct password is provided, the locked application may be unlocked and invoked. The user may lock a given application by highlighting the application in a list of applications (e.g., on a program guide display screen such as shown in FIG. 25*a*) and by pressing lock key 260 (FIG. 9) or otherwise selecting the application. In the example of FIG. 25*a*, the applications video-on-demand and banking have been locked, as indicated by lock icons 262. Favorites indicators 258 and lock icons 262 are merely illustrative. Any suitable indicators may be used to mark which applications are favorites or are locked. As shown in FIG. 25*c*, when the user attempts to invoke a parentally-controlled application, the program guide provides the user with an opportunity to enter the parental control password.

Figure 25D:
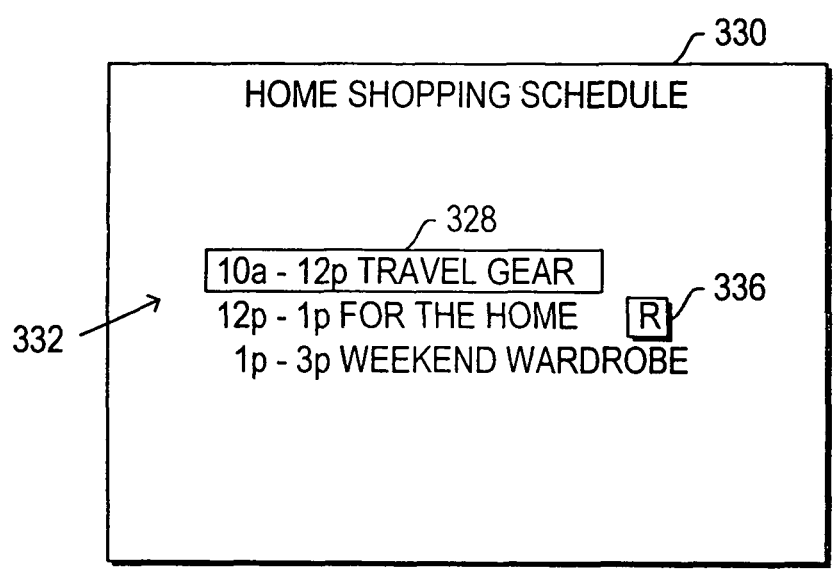
FIG. 25*d* is an illustrative home shopping application listings screen in accordance with the present invention.

The user may also set reminders for the content associated with various non-program guide applications. For example, a non-program guide application such as a home shopping application may present the user with a display screen of listings for upcoming events. As shown in FIG. 25*d*, a home shopping application may present a screen 330 of listings 332 of scheduled upcoming segments. The user may move a highlight region such as highlight region 328 on top of a desired segment and may press a suitable remote control key such as an OK key to select that segment. The home shopping application may then present a prompt asking the user whether the user would like to set a reminder for the selected segment. If the user answers affirmatively, the home shopping application (or the program guide or other suitable system component) may set a reminder for the selected segment. An icon such as reminders icon 336 may be displayed adjacent to the listings for those segments for which reminders have been set. Just before the scheduled broadcast time of this segment, a reminder may be displayed on the user's television that reminds the user of the upcoming segment. Schedule information for the home shopping segments may be provided as part of a program listings database or as separate data.

If desired, the user may set a reminder for a segment or subject that is not yet scheduled for a particular time. Just before the segment is broadcast, a reminder may be displayed on the user's television that reminds the user of the segment.

The content for which the reminder is set is may be content that is provided by the application (e.g., home shopping information displayed by the home shopping application), may be content from one application that is embedded into another application (e.g., a web page embedded into a home shopping application), or may be content that the application assists the user in locating and using (e.g., home shopping video segments).

Other applications may also have associated content for which reminders may be set. For example, the user may set reminders for particular contests or races (e.g., by selecting a desired contest or race from a screen in which various contests and races are listed by a gaming service application). As another example, the user may also set reminders for certain web events or for web-based or cable-system-based chat sessions.

Figure 26:
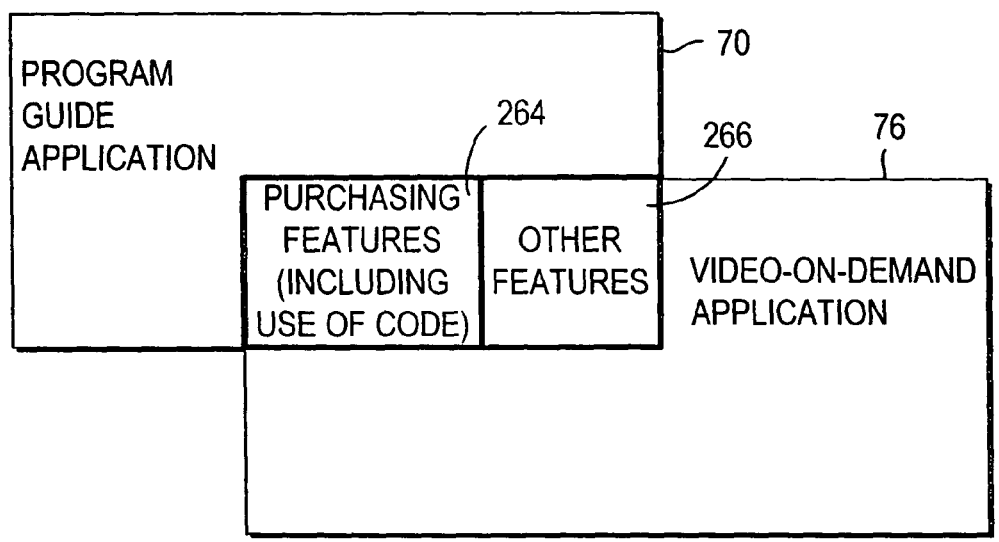
FIG. 26 is a diagram illustrating how the purchasing features of the interactive television program guide application may be shared between the program guide application and one of the non-program guide applications in accordance with the present invention.

Program guide application 70 may allow a non-program-guide application to use the purchase mechanisms (e.g., authorization procedures, etc.) of program guide application 70, including use of a purchase code or password. This allows parents to control what children in a household may purchase. As shown in FIG. 26, when such purchase mechanisms are shared between program guide application 70 and video-on-demand application 76 (for example), there is an overlap 264 associated with the shared purchasing features in addition to overlap 266 associated with other shared features between these applications. Features associated with the overlap may include purchasing screen features, purchase code features, credit card order features, shipping address features, billing address features, etc.

Figure 27:
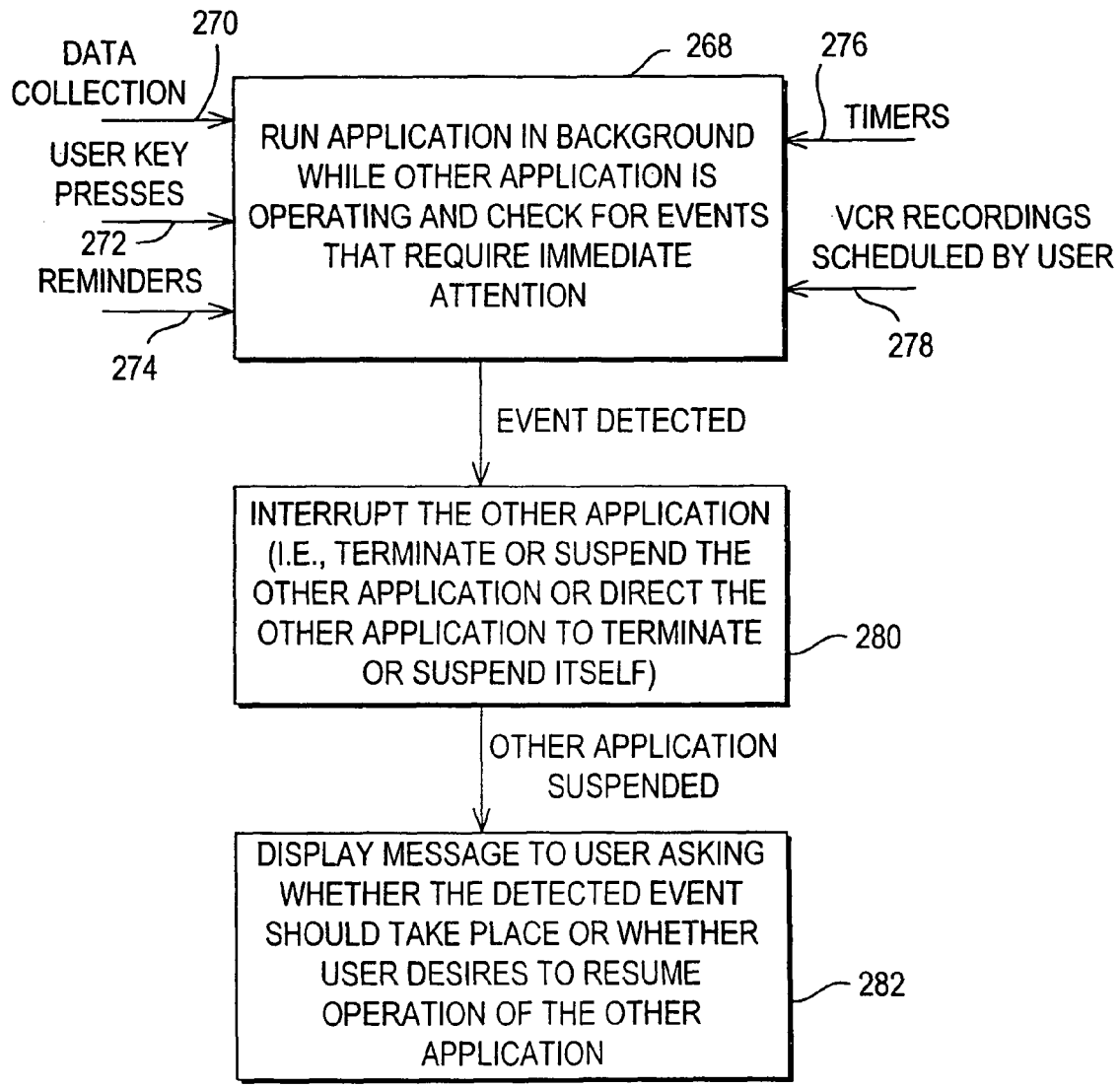
FIG. 27 is an illustrative flow chart of steps involved in running an application in the background while another application operates in the foreground in accordance with the present intention.

FIG. 27 shows steps involved in allowing one application (such as program guide application 70) to run in the background while another application is running in the foreground. At step 268 the background application may check for events that may require immediate attention. For example, the background application may handle data collection tasks, as indicated by data collection input 270. The background application may also handle tasks associated with monitoring user actions, such as pressing a key on remote control 56 (FIG. 9) that the background application is monitoring. When the background application is a program guide application, the keys that are monitored may include keys such as guide key 271, which is used to invoke and exit program guide listings screens provided by the program guide application, as indicated by user key presses input 272. The background application may also monitor user-selected actions. When the background application is a program guide application, such user-selected actions may include program reminders (shown as reminders input 274), timers (shown as timers input 276), and recordings scheduled to be recorded with the videocassette recorder (shown as VCR recordings scheduled by user input 278).

If an event that requires immediate attention is detected corresponding to one of inputs 270, 272, 274, 276, or 278 or other such inputs, the background application may interrupt the foreground application by terminating or suspending the foreground application (or by asking that application to terminate or suspend itself) at step 280. When the foreground application has been suspended, the background application may display a message to the user at step 282 asking whether the detected event should take place or whether operation of the foreground application should be resumed.

Figure 28:
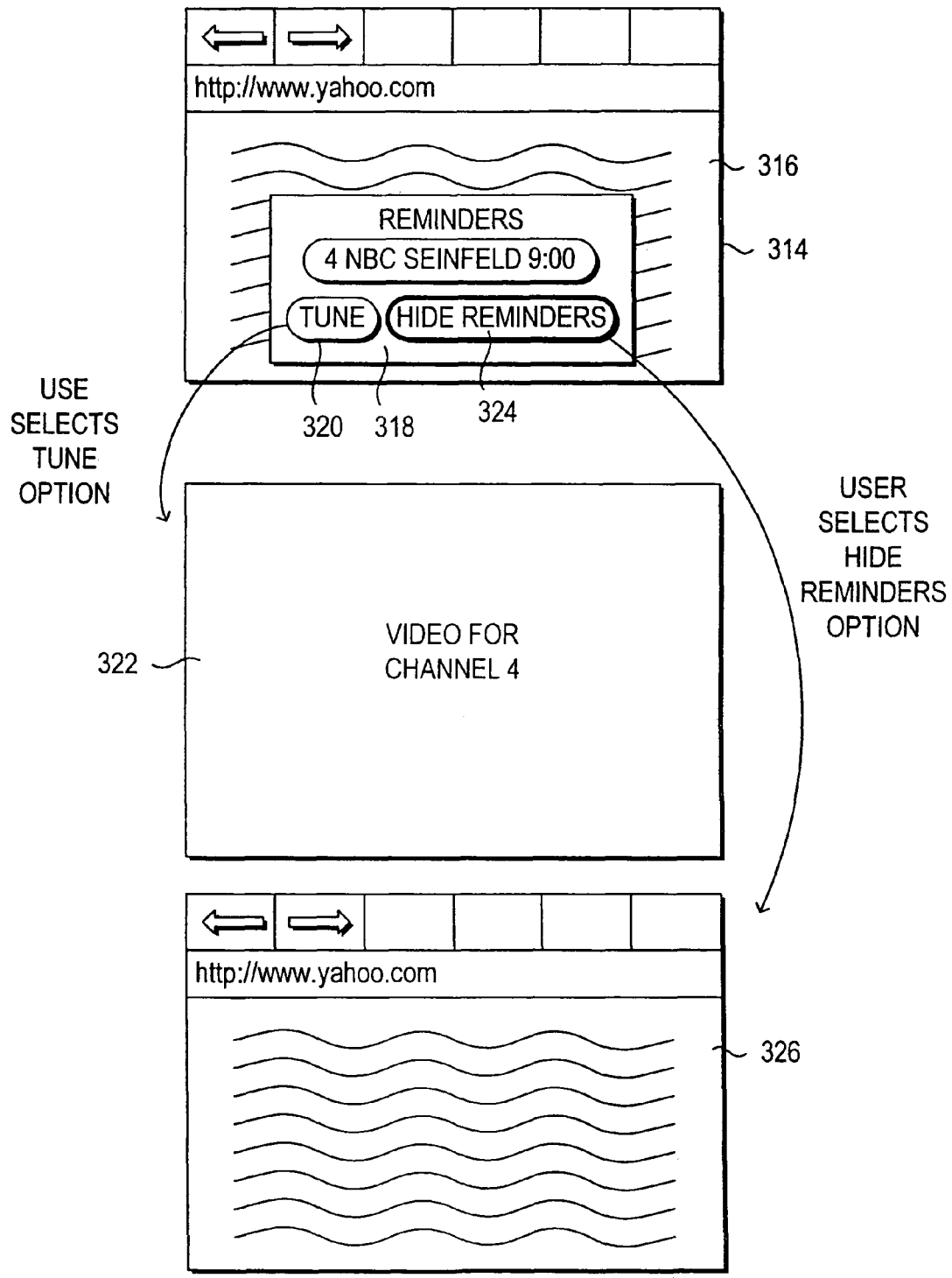
FIG. 28 is an illustrative series of display screens showing how a program guide reminder overlay may be provided on top of a running non-program guide application such as a web browser to notify the user of an upcoming television program in accordance with the present invention.

An illustrative example is shown in FIG. 28. In the example of FIG. 28, a web browser application is running in the foreground and a program guide with which program reminders have been set is running in the background. As shown in screen 314, just before the scheduled broadcast time of the program for which the reminder was set, the operation of web browser 316 may be suspended and a reminders display 318 overlaid on top of web browser 316. Reminders display 318 contains information on the programs for which the reminder was set such as the title of the program. If the user decides to watch the program, the user may select tune option 320. Selecting tune option 320 directs the system to terminate operation of web browser 316 and to tune to the channel 322 for the selected program. If the user decides to ignore the reminder, the user may select hide reminders option 324. Selecting hide reminders option 324 directs the program guide to hide reminders display 318 and to remain in the background. The foreground application (the web browser) resumes operation as shown in screen 326.

Figure 29A:
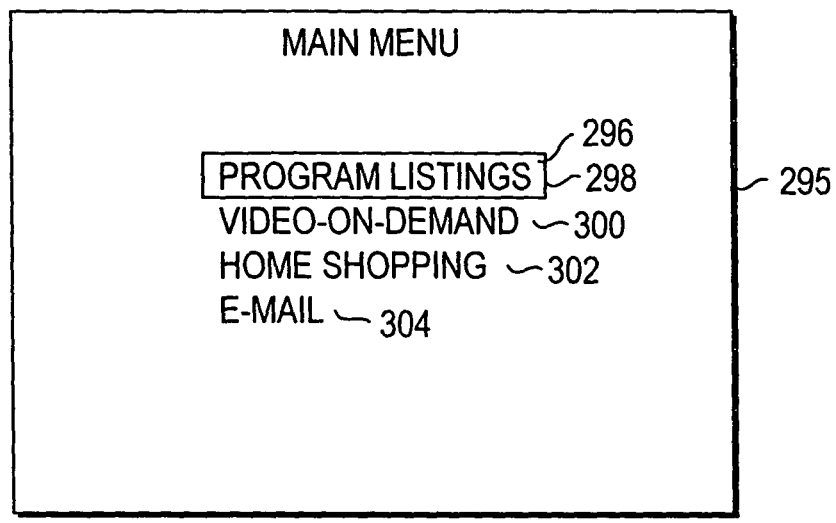
FIG. 29*a* is a program guide display screen for a main menu showing how selectable options may be provided for the non-program-guide applications in accordance with the present invention.
Figure 30:
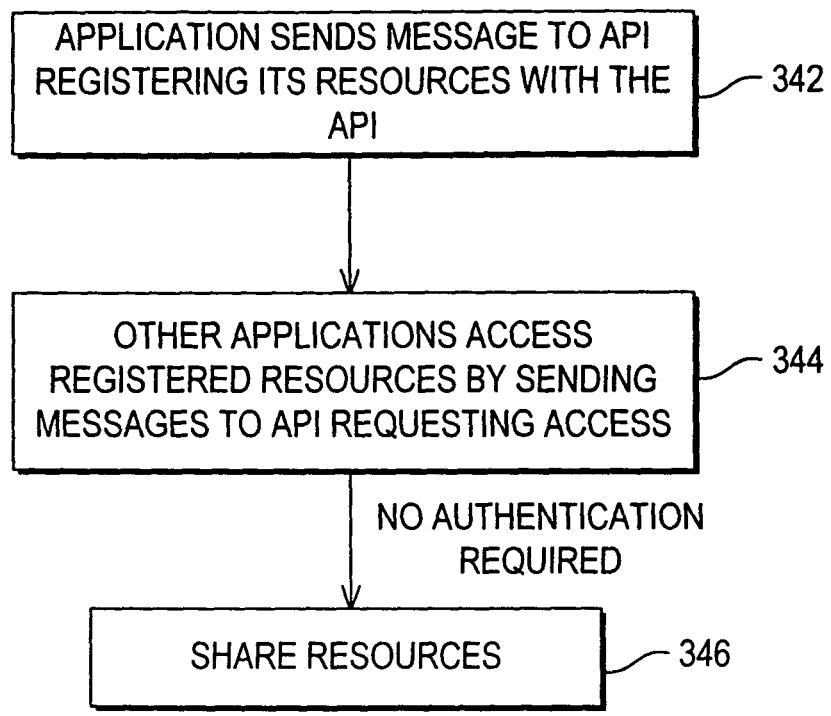
FIG. 30 is a flow chart of steps associated with registering an application with the application program guide interface in accordance with the present invention.

Program guide application 70 may provide options in various program guide menus that allow the user to launch non-program guide applications directly from such menus. An illustrative program guide menu 295 is shown in FIG. 29*a* that contains program listings option 296 for viewing program guide display screens containing program listings (shown as being selected by highlight region 298), video-on-demand option 300 for launching a video-on-demand application, home shopping option 302 for launching a home shopping application, and e-mail option 304 for launching an e-mail application. The non-program-guide applications shown in FIG. 30 are merely illustrative. Any suitable non-program-guide application may be launched from a program guide menu screen if desired.

Figure 29B:
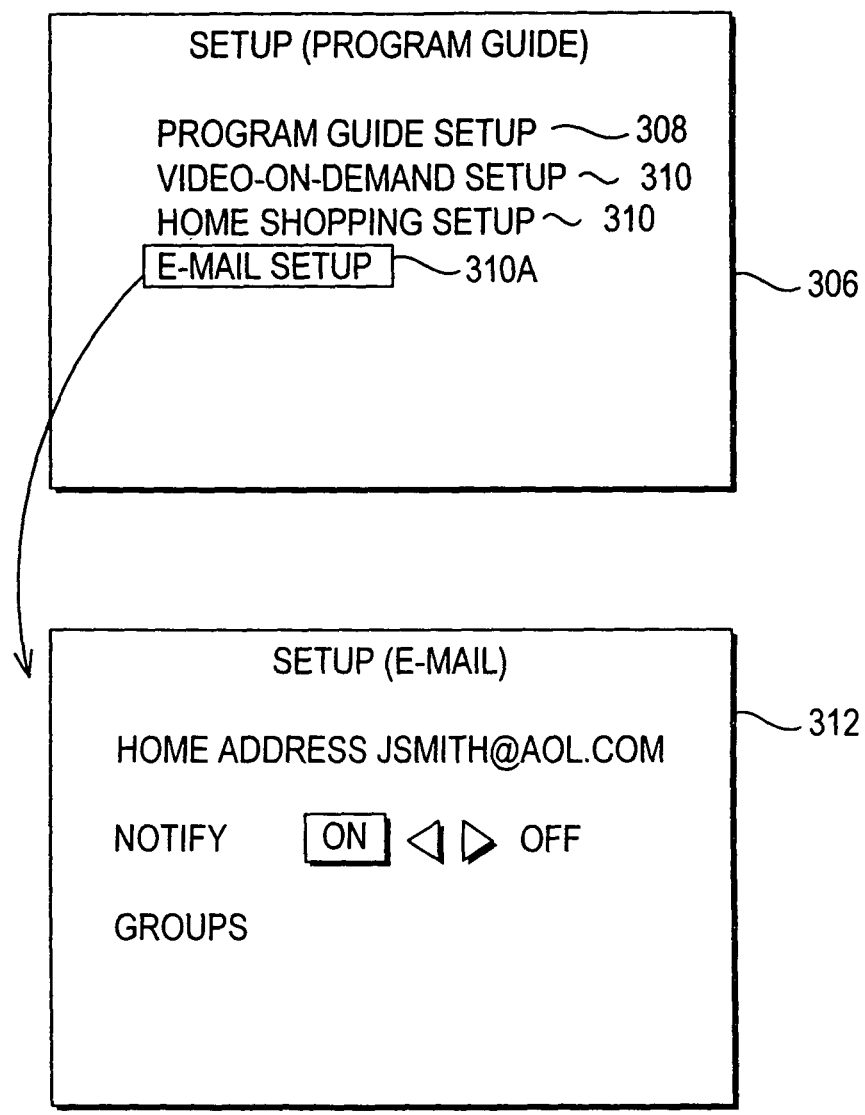
FIG. 29*b* shows an illustrative program guide setup screen containing selectable options that allow the user to launch non-program guide applications and be taken to associated setup screens within those applications in accordance with the present invention.

As shown in FIG. 29b, program guide application 70 may provide a setup menu screen 306. If the user selects option 308, the user is presented with program guide setup options that allow the user to customize various features of the program guide. If the user selects one of options 310, an associated non-program-guide application is launched and is directed to present its setup screen to the user. For example, if the user selects option 310a (e-mail setup), an associated e-mail application is launched and the user is taken to a setup screen 312 within the e-mail application. The setup example of FIG. 29b is merely illustrative. If desired, the launched application may be directed to provide any suitable screen or function when it is launched.

An application program interface may provide authentication features to help control access to application resources. Illustrative steps involved in coordinating resource access are shown in FIG. 30. At step 342, an application sends a message to the application program interface requesting that the resources of the application be registered with the application program interface. At step 344, other applications may attempt to access the registered resources. If no authentication is required by the registered application, the requested resources may be shared at step 346.

Figure 31:
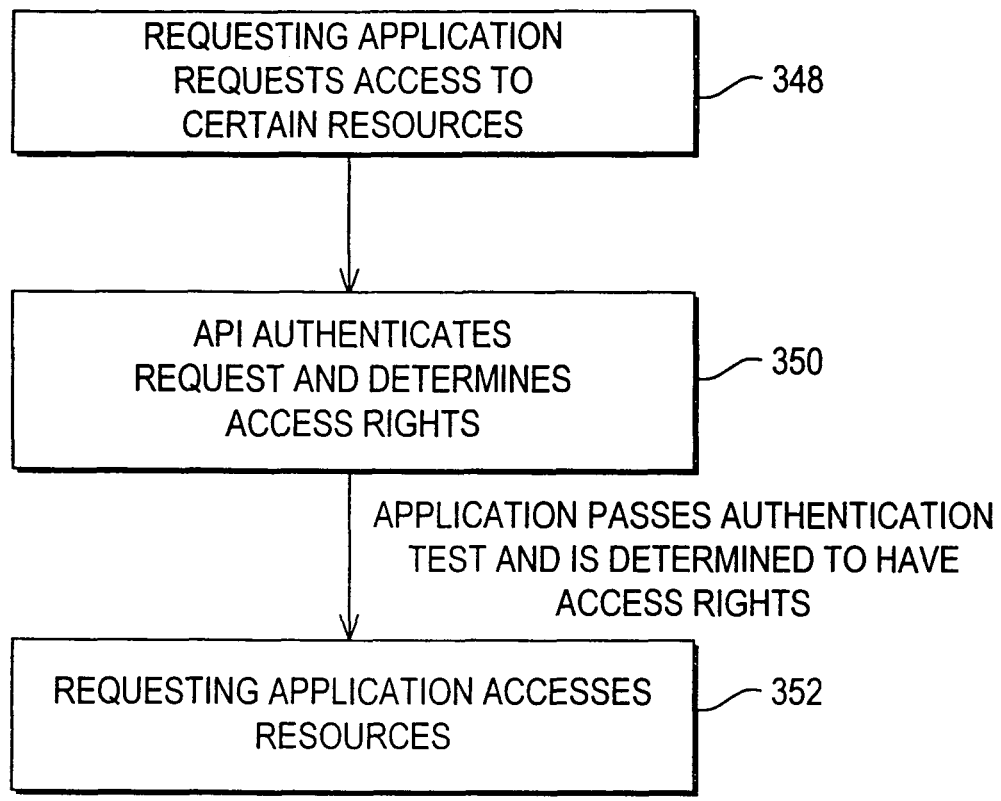
FIG. 31 is a flow chart of steps involved in authenticating an application and determining the access rights of an application in accordance with the present invention.

If desired, requesting applications may need to be authenticated and may need to have their access rights to certain resources checked. As shown in FIG. 31, a requesting application may request access to the resources of another application at step 348. At step 350, the application program interface authenticates the request. This may be done, for example, by checking a password provided by the requesting application against a previously established password or by checking whether the requested application is on a list of approved applications. Step 350 may also involve determining whether the requesting application has sufficient access rights to access the requested resources. If the requesting application passes the tests of step 350, the requesting application may access the desired resources of the other application at step 352.

Figure 32:
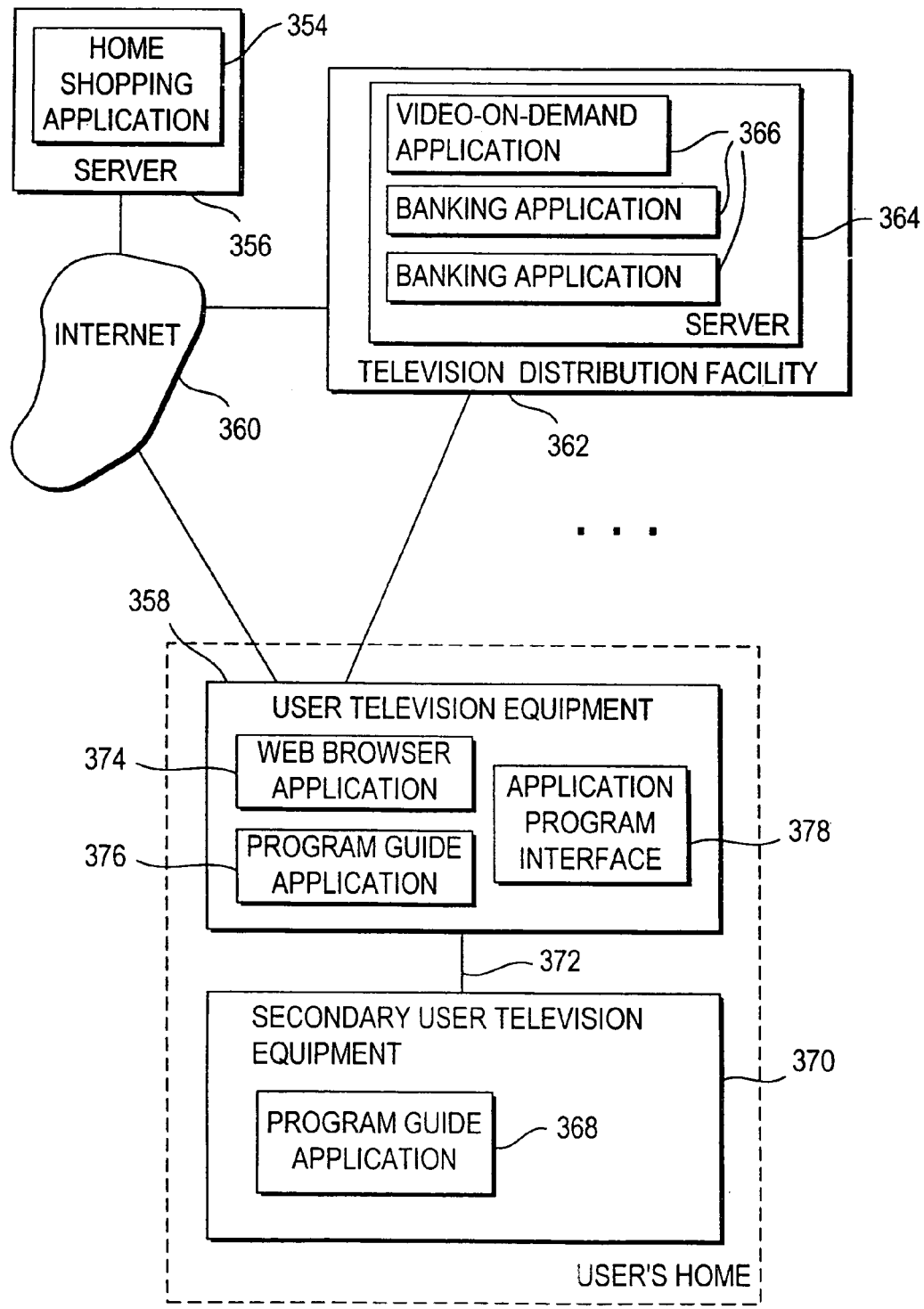
FIG. 32 is a diagram illustrating how applications that use the application program guide interface may be based at various locations such as on user television equipment, secondary user television equipment, an Internet server, or a server associated with a television distribution facility in accordance with the present invention.

The application program interface of the present invention may coordinate the activities of program guide applications and non-program-guide applications that reside at locations other that the user's user television equipment. For example, as shown in FIG. 32, an application such as home shopping application 354 may be located on a server 356 that is connected to user television equipment 358 via the Internet 360 or other such suitable data network or via the Internet 360 and television distribution facility 362.

Applications may also be located on a server 364 or other suitable equipment at the television distribution facility. Because server 364 may have fewer memory size constraints than user television equipment 358, relatively more applications may be provided server 364 than may be provided on a single user television equipment device. For example, two different banking applications 366 may be provided on server 364, giving the user a choice as to which application the user prefers.

Applications may also be located on other user television equipment within the user's home. For example, applications may be located on equipment within the home that is connected to the user's user television equipment with an in-home communications path (e.g., a bus or other path, which may form an in-home network). For example, a program guide application 368 may be provided on secondary user television equipment 370 that is connected to user television equipment 358 by communications path 372. Applications located on equipment within the home may also be connected to the user's television equipment with a communications path the leaves the home, such as a communications path involving a remote server or the like. Further features of in-home network arrangements are described in Ellis et al. U.S. patent application Ser. No. 09/356,161, filed concurrently herewith, which is hereby incorporated by reference herein in its entirety.

All of the applications at locations other than user television equipment 358 may interact with and share resources with non-program guide applications such as web browser application 374 and program guide application 376 that are located on user television equipment 358. Application program interface 378 may help to coordinate access to the various resources in the system. This may be accomplished using any suitable communications protocol. For example, applications located remote from user television equipment 358 may send messages to application program interface 378 requesting access to resources and the like using a protocol such as Hypertext Transfer Protocol (HTTP) or an Internet Protocol (IP).

An example of an in-home arrangement in which multiple applications share resources is an arrangement in which a first program guide is implemented on a first user television equipment device and a second program guide is implemented on second user television equipment. The first and second user television equipment devices may be interconnected using any suitable in-home network or communications paths. A user (e.g., a parent) may adjust parental control settings or other program guide settings using the first program guide. The adjusted settings are then used by the second program guide. Application program interface 378 (which may be implemented on either the first or second user television equipment device) coordinates access of the first and second program guides to the resources in the system.

Another example of an in-home arrangement in which multiple applications share resources is an arrangement in which a program guide is implemented on one user television equipment device and a home shopping application is implemented on another user television equipment device. The user television equipment devices may be interconnected using any suitable in-home network or communications paths. Application program interface 378 (which may be implemented on either of the user television equipment devices) coordinates access of the program guide and home shopping application to resources in the system (e.g., program guide resources and resources of the user television equipment devices). For example, application program interface 378 may coordinate access to purchasing resources of the program guide that are used by the home shopping application.

The foregoing is merely illustrative of the principles of this invention and various modifications can be made by those skilled in the art without departing from the scope and spirit of the invention.

What is claimed is:

1. A method for using an interactive program guide system in which an interactive program guide application is at least partially implemented on user equipment of a user, comprising:

implementing a plurality of non-program-guide applications that each provides an interactive component, wherein each of the non-program-guide applications runs on a processor of the user equipment separately from the interactive program guide application;

storing an application program interface that allows the plurality of non-program-guide applications to use program guide functions of the interactive program guide application when providing the interactive component to the user;

activating an option within the interactive program guide application to schedule a reminder to access the interactive component from at least one of the non-program-guide applications;

launching the at least one of the non-program-guide applications with the interactive program guide application; and calling the application program interface from the at least one of the non-program-guide applications to provide the interactive component using one of the program guide functions.

2. The method defined in claim 1 wherein the launching comprises generating a display of an on-screen option on the user equipment with the interactive program guide application.

3. The method defined in claim 2 further comprising including video-on-demand program listings as part of a program guide display screen generated for display on the user equipment by the interactive program guide application.

4. The method defined in claim 3 further comprising generating a display of the video-on-demand program listings in a list of program listings generated for display on the user equipment by the interactive program guide application.

5. The method defined in claim 2 wherein the generating a display of the on-screen option further comprises using the interactive program guide application to generate for display a menu option on a program guide display screen.

6. The method defined in claim 2 wherein the generating a display of the on-screen option further comprises generating a display of the on-screen option in a program guide display screen containing program listings devoted to a specific type of content with the interactive program guide application.

7. The method defined in claim 1 wherein the launching further comprises launching the non-program-guide application with the interactive program guide application using a hot link.

8. The method defined in claim 7 wherein the hot link relates to a web browser application, the method further comprising:

launching the web browser application from the interactive program guide application; and directing the web browser application to access a web page with content related to the content of the interactive program guide application.

9. The method defined in claim 7 wherein the hot link relates to an electronic mail application, the method comprising:

launching the electronic mail application from the interactive program guide application; and directing the electronic mail application to address electronic mail to an address related to the content of the interactive program guide application.

10. The method defined in claim 7 wherein the hot link relates to a home shopping application, the method comprising:

launching the home shopping application from the interactive program guide application; and directing the home shopping application to present products related to the content of the interactive program guide application.

11. The method defined in claim 7 wherein the hot link relates to a chat application, the method comprising:

launching the chat application from the interactive program guide application; and directing the chat application to perform functions based on the content of the interactive program guide application.

12. The method defined in claim 1 further comprising using the application program interface to allow the user to access the non-program-guide application while maintaining a consistent user interface.

13. The method defined in claim 1 further comprising using the application program interface to coordinate access to platform resources by the interactive program guide application and the non-program-guide applications.

14. The method defined in claim 1 wherein the interactive program guide application has a number of program guide resources, and wherein the method further comprises using the application program interface to provide the non-program-guide applications with access to the program guide resources.

15. The method defined in claim 1 wherein the interactive program guide application is also partially implemented on a server.

16. The method defined in claim 1 wherein the interactive program guide application is implemented only on the user equipment.

17. The method defined in claim 1 further comprising embedding non-program-guide application content in a program guide display screen provided by the interactive program guide application.

18. The method defined in claim 1 wherein the program guide functions comprise at least one of the group of: tuning, parental control, favorites, user profiles, drawing, highlighting and on-screen navigation, database access, and purchasing.

19. The method defined in claim 1 wherein the application program interface that authenticates and authorizes the plurality of non-program-guide applications provides different access rights for each of the program guide functions and resources for each of the plurality of non-program guide applications.

20. The method of claim 1, further comprising:

using the application program interface to coordinate access to a plurality of platform resources among the interactive program guide application and the plurality of non-program-guide applications when the at least one of the plurality of non-program-guide applications operates as a foreground application, and another application from among the plurality of non-program-guide applications and the interactive guide application operate as background applications.

21. The method of claim 1, further comprising monitoring the interactive program guide application for the occurrence of events while the non-program-guide application is providing the interactive component.

22. The method of claim 1, wherein at least one of the non-program-guide applications is implemented on a device remote from the user equipment.

23. The method of claim 1 further comprising:

determining, using the application program interface, whether a desired function, to provide the interactive component, required by at least one of the plurality of non-program guide applications is consistent with one of the program guide functions; and allowing, based on the determining, access of the interactive program guide application to the at least one of the plurality of non-program guide applications.

24. An interactive program guide system comprising:

user equipment on which an interactive program guide application and a plurality of non-program-guide applications that each provides an interactive component are at least partially implemented, wherein each of the non-program-guide applications runs on a processor of the user equipment separately from the interactive program guide application, the interactive program guide application having an application program interface that allows the plurality of non-program-guide applications to use program guide functions of the interactive program guide application when providing the interactive component to the user, wherein the application program interface activates an option within the interactive program guide application to schedule a reminder to access the interactive component from at least one of the non-program guide applications, wherein the interactive program guide application launches the at least one of the non-program-guide applications, and wherein the at least one of the non-program-guide application calls the application program interface to provide the interactive component using one of the program guide functions.

25. The system defined in claim 24 wherein the interactive program guide application generates a display of an on-screen option on the user equipment for the user to launch the non-program-guide application.

26. The system defined in claim 25 wherein the interactive program guide application generates a display of a program guide display screen containing video-on-demand program listings.

27. The system defined in claim 25 wherein the interactive program guide application generates a display of the video-on-demand program listings in a list of program listings on the user equipment.

28. The system defined in claim 25 wherein the interactive program guide application generates a display of the on-screen option as a menu option on a program guide display screen.

29. The system defined in claim 25 wherein the interactive program guide application generates a display of the on-screen option in a program guide display screen containing program listings devoted to a specific type of content.

30. The system defined in claim 24 wherein the interactive program guide application launches the non-program-guide application using a hot link.

31. The system defined in claim 30 wherein:
the hot link relates to a web browser application;
the web browser application is launched from the interactive program guide application; and
the web browser application is directed to access a web page with content related to the content of the interactive program guide application when the web browser application is launched.

32. The system defined in claim 30 wherein:
the hot link relates to an electronic mail application;
the electronic mail application is launched from the interactive program guide application; and
the electronic mail application is directed to address electronic mail to an address related to the content of the interactive program guide application when the electronic mail application is launched.

33. The system defined in claim 30 wherein:
the hot link relates to a home shopping application;
the home shopping application is launched from the interactive program guide application; and
the home shopping application is directed to present products related to the interactive program guide application when the home shopping application is launched.

34. The system defined in claim 30 wherein:
the hot link relates to a chat application;
the chat application is launched from the interactive program guide application; and
the chat application is directed to perform functions related to the content of the interactive program guide application when the chat application is launched.

35. The system defined in claim 24 wherein the application program interface allows the user to access the non-program-guide application while maintaining a consistent user interface.

36. The system defined in claim 24 wherein the application program interface coordinates access to platform resources among the interactive program guide application and the non-program-guide applications.

37. The system defined in claim 24 wherein the interactive program guide application has a number of program guide resources and wherein the application program interface provides the non-program-guide applications with access to the program guide resources.

38. The system defined in claim 24 wherein the interactive program guide application is also partially implemented on a server.

39. The system defined in claim 24 wherein the interactive program guide application is implemented only on the user equipment.

40. The system defined in claim 24 wherein the interactive program guide application embeds non-program-guide application content in at least one program guide display screen.

41. The system defined in claim 24 wherein the program guide functions comprise at least one of the group of: tuning, parental control, favorites, user profiles, drawing, highlighting and on-screen navigation, database access, and purchasing.

42. The system defined in claim 24 wherein the application program interface that authenticates and authorizes the plurality of non-program-guide applications provides different access rights for each of the program guide functions and resources for each of the plurality of non-program guide applications.

43. The system of claim 24, wherein at least one of the non-program-guide applications is implemented on a device remote from the user equipment.

44. The system of claim 24 wherein the application program interface determines whether a desired function, to provide the interactive component, required by at least one of the plurality of non-program guide applications is consistent with one of the program guide functions; and wherein the application program interface, based on the determination, allows access of the interactive program guide application to the at least one of the plurality of non-program guide applications.

45. A method for using an interactive video guide system in which an interactive video guide application is at least partially implemented on user equipment of a user, comprising:
implementing a plurality of non-video-guide applications that each provides an interactive component, wherein each of the non-video-guide applications runs on a processor of the user equipment separately from the interactive video guide application;
storing an application program interface that allows the plurality of non-video-guide applications to use video guide functions of the interactive video guide application when providing the interactive component to the user;

activating an option within the interactive video guide application to schedule a reminder to access the interactive component from at least one of the non-video-guide applications;

launching the at least one of the non-video-guide applications with the interactive video guide application; and calling the application program interface from the at least one of the of non-video-guide applications to provide the interactive component using one of the video guide functions.

46. The method of claim 45, further comprising suspending the operation of the non-video-guide application in response to an event which occurs in the interactive video guide application.

47. The method of claim 45, wherein at least one of the non-video-guide applications is implemented on a device remote from the user equipment.

48. The method of claim 45 further comprising:

determining, using the application program interface, whether a desired function, to provide the interactive component, required by at least one of the plurality of non-video-guide applications is consistent with one of the video guide functions; and allowing, based on the determining, access of the interactive video guide application to the at least one of the plurality of non-video-guide applications.

* * * * *